(12) United States Patent
Hsu et al.

(10) Patent No.: US 8,774,722 B2
(45) Date of Patent: Jul. 8, 2014

(54) SYSTEMS AND METHODS FOR REDUCING INTERFERENCE BETWEEN A PLURALITY OF WIRELESS COMMUNICATIONS MODULES

(75) Inventors: Hong-Kai Hsu, Yonghe (TW); Li-Chun Ko, Taipei (TW); Chia-Ming Chang, Hsinchu (TW); Chih-Hao Yeh, Yonghe (TW); En-Chia Hsia, Kaohsiung (TW); I-Lin Hsieh, Hsinchu (TW); Wen-Ying Chien, Hsinchu (TW); Jwo-An Lin, Taipei (TW); Ting-Che Tseng, Hsinchu (TW); Yuan Chen, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 336 days.

(21) Appl. No.: 12/829,943

(22) Filed: Jul. 2, 2010

(65) Prior Publication Data

US 2011/0009060 A1 Jan. 13, 2011

Related U.S. Application Data

(60) Provisional application No. 61/224,107, filed on Jul. 9, 2009, provisional application No. 61/298,627, filed on Jan. 27, 2010.

(51) Int. Cl.
*H04B 1/00* (2006.01)

(52) U.S. Cl.
USPC .......... 455/63.1; 455/67.13; 455/69; 455/522; 570/318

(58) Field of Classification Search
CPC ...... H04B 15/00; H04W 16/14; H04W 52/04; H04W 52/243

USPC ................ 455/63.1, 67.13, 69, 522; 370/318
See application file for complete search history.

(56) References Cited

U.S. PATENT DOCUMENTS

| | | | |
|---|---|---|---|
| 6,185,434 B1 | 2/2001 | Hagstrom et al. | |
| 6,826,162 B2 | 11/2004 | Haines et al. | |
| 7,446,626 B2 | 11/2008 | Gorbachov | |
| 7,496,060 B2 | 2/2009 | Ramirez et al. | |
| 7,924,943 B2 * | 4/2011 | Kim et al. ............... | 375/299 |

(Continued)

FOREIGN PATENT DOCUMENTS

| | | |
|---|---|---|
| CN | 101154951 | 4/2008 |
| CN | 101232674 | 7/2008 |

(Continued)

OTHER PUBLICATIONS

English language translation of abstract of CN 101154951 (published Apr. 2, 2008).

(Continued)

*Primary Examiner* — Raymond Dean
(74) *Attorney, Agent, or Firm* — McClure, Qualey & Rodack, LLP

(57) ABSTRACT

A wireless communications system is provided with a first wireless communications and a second wireless communications. The first wireless communications module transmits or receives a first wireless signal in a first frequency band selected from a first frequency range. The second wireless communications module transmits or receives a second wireless signal in a second frequency band selected from a second frequency range, and adjusts a transmission power of the second wireless signal in response to that a frequency offset between the first frequency band and the second frequency band falls within a predetermined range.

14 Claims, 33 Drawing Sheets

(56) References Cited

U.S. PATENT DOCUMENTS

| | | |
|---|---|---|
| 8,077,755 B2 | 12/2011 | Wu et al. |
| 8,155,612 B1 | 4/2012 | Husted et al. |
| 8,391,916 B2 | 3/2013 | Tomizu |
| 2002/0053947 A1 | 5/2002 | Macedo |
| 2003/0198280 A1* | 10/2003 | Wang et al. .................. 375/132 |
| 2004/0192222 A1 | 9/2004 | Vaisanen et al. |
| 2005/0163070 A1 | 7/2005 | Farnham et al. |
| 2006/0194600 A1 | 8/2006 | Palin et al. |
| 2007/0021066 A1 | 1/2007 | Dravida et al. |
| 2007/0099567 A1 | 5/2007 | Chen et al. |
| 2007/0117558 A1 | 5/2007 | Balwani |
| 2007/0224936 A1 | 9/2007 | Desai |
| 2008/0123610 A1 | 5/2008 | Desai et al. |
| 2008/0139118 A1 | 6/2008 | Sanguinetti |
| 2008/0192806 A1 | 8/2008 | Wyper et al. |
| 2008/0253345 A1 | 10/2008 | Sanguinetti |
| 2008/0279138 A1 | 11/2008 | Gonikberg et al. |
| 2009/0040937 A1 | 2/2009 | Xhafa et al. |
| 2009/0111500 A1 | 4/2009 | Sudak et al. |
| 2009/0176454 A1* | 7/2009 | Chen et al. .................. 455/63.1 |
| 2009/0239471 A1 | 9/2009 | Tran et al. |
| 2009/0258607 A1 | 10/2009 | Beninghau et al. |
| 2010/0008252 A1 | 1/2010 | Alve |
| 2010/0210299 A1 | 8/2010 | Gorbachov |
| 2010/0260082 A1 | 10/2010 | Lum et al. |
| 2010/0262987 A1 | 10/2010 | Imanilov |

FOREIGN PATENT DOCUMENTS

| | | |
|---|---|---|
| CN | 101252757 A | 8/2008 |
| CN | 101253735 | 8/2008 |
| DE | 112005003515 T5 | 3/2008 |
| JP | 2006-080839 | 3/2006 |
| JP | 2008235978 | 10/2008 |
| JP | 2009-065307 | 3/2009 |
| TW | 2006 29938 | 8/2006 |
| WO | WO 2007/120945 | 10/2007 |

OTHER PUBLICATIONS

English language translation of abstract of CN 101232674 (published Jul. 30, 2008).
English language translation of abstract of DE112005003515T5 (published Mar. 13, 2008).
English language translation of abstract of JP 2008235978 (published Oct. 2, 2008).
German language office action dated Mar. 7, 2011.
English language translation of office action.
English language translation of abstract of CN 101252757A (published Aug. 27, 2008).
English language translation of abstract of CN 101253735 (published Aug. 27, 2008).
English language translation of abstract of TW 2006 29938 (published Aug. 16, 2006).
English language translation of abstract of JP 2009-065307 (published Mar. 26, 2009).

* cited by examiner

SYSTEMS AND METHODS FOR REDUCING INTERFERENCE BETWEEN A PLURALITY OF WIRELESS COMMUNICATIONS MODULES

CROSS REFERENCE TO RELATED APPLICATIONS

This application claims the benefit of U.S. Provisional Application No. 61/224,107, filed on Jul. 9, 2009, the entirety of which is incorporated by reference herein; and U.S. Provisional Application No. 61/298,627, filed on Jan. 27, 2010, the entirety of which is incorporated by reference herein.

BACKGROUND OF THE INVENTION

1. Field of the Invention

The invention relates generally to the coexistence between a plurality of wireless communications modules, and more particularly, to systems and methods for the reducing interference between a plurality of co-existed wireless communications modules.

2. Description of the Related Art

To an increasing extent, a multitude of communication functions are being merged into mobile devices. As shown in FIG. 1, a cellular phone may connect to a wireless local area network (WLAN) via a Wireless Fidelity (WiFi) module thereof and simultaneously communicate with a Bluetooth (BT) handset (or a Bluetooth car audio, or others) through a Bluetooth module thereof. A WLAN system is typically implemented inside buildings as an extension to wired local area networks (LANs) and is able to provide the last few meters of connectivity between a wired network and mobile or fixed devices. According to the IEEE 802.11 standard, most WLAN systems may operate in the 2.4 GHz license-free frequency band and have very low throughput rates because of the coexistence interference from BT. Referring to FIG. 1, a WLAN is established by an access point (AP) connecting to a LAN by an Ethernet cable. The AP typically receives, buffers, and transmits data between the WLAN and the wired network infrastructure. The AP may support, on average, twenty devices and have a coverage varying from 20 meters in an area with obstacles (walls, stairways, elevators etc) to 100 meters in an area with clear line of sight. Bluetooth is an open wireless protocol for exchanging data over short distances from fixed and mobile devices, creating personal area networks (PANs). The cellular phone may receive the voice over internet protocol (VoIP) data via the WiFi module and further transmit the VoIP data through an established PAN to the Bluetooth handset, and vice versa. Alternatively, the cellular phone may transmit digital music through the established PAN to be played back in the Bluetooth handset. The WLAN and Bluetooth systems both occupy a section of the 2.4 GHz Industrial, Scientific, and Medical (ISM) band, which is 83 MHz-wide. Due to cost issues as well as space requirements for components, modern electronic devices, such as cellular phones, Ultra-Mobile PCs (UMPCs) or others, are equipped with WiFi and Bluetooth modules sharing a single antenna instead of multiple antennas.

As an example shown in FIG. 2, a Bluetooth system uses a Frequency Hopping Spread Spectrum (FHSS) and hops between 79 different 1 MHz-wide channels in a Bluetooth spectrum. A WLAN system uses a Direct Sequence Spread Spectrum (DSSS) instead of a FHSS. A WLAN system carrier remains centered on one channel, which is 22 MHz-wide. When the WiFi module and the Bluetooth module are operating simultaneously in the same area, as shown in FIG. 1, the single WLAN channel, which is 22 MHz-wide, occupies the same frequency space as 22 out of 79 Bluetooth channels which are 1 MHz-wide. When a Bluetooth transmission occurs on a frequency band that falls within the frequency space occupied by an ongoing WLAN transmission, a certain level of interference may occur, depending on the signal strength thereof. Due to the fact that the WiFi module and Bluetooth module share the same spectrum and also share a single antenna, avoiding interference therebetween is required.

FIG. 3 is a diagram illustrating an operation conflict which may occur between a WLAN and a Bluetooth communication services sharing a single antenna. In FIG. 3, the shared single antenna is switched between WLAN and Bluetooth communication services in a given time slot for transceiving data. If the Bluetooth communication service carries audio data that requires real-time transmission, for example, the Synchronous Connection-Oriented (SCO) packets, the Bluetooth communication service would have a higher priority over the WLAN communication service. In this case, when a WLAN transceiving process takes place at the same time as the real-time Bluetooth transceiving process, the time slot will be assigned to the Bluetooth transceiving process and the WLAN transceiving process will be blocked. As shown in FIG. 3, the WLAN receiving operation (Rx operation) 1 occurs in the time slot, while the Bluetooth communication service is idle. Therefore, the Rx operation 1 is performed without interference and an acknowledgement (ACK) message 2 is sent to the WLAN AP (such as the AP in FIG. 1) as a reply message indicating that the Rx operation 1 is finished. Following the Rx operation 1, another WLAN Rx operation 3 is performed. The Rx operation 3 is also performed without interference because the Bluetooth communication service is in the idle state. However, an ACK message 4 in response to the Rx operation 3 can not be replied to the WLAN AP, as its time slot is already assigned to the Bluetooth transmitting operation (Tx operation). Accordingly, the Rx operation 3 would be determined to have failed. In response to the failure, the WLAN AP would re-sent the data with a lower data rate in an attempt to successfully transmit data to the WLAN module of the mobile device. Unfavorably, the re-performed Rx operation 3 (denoted as 5), with a prolonged operation period, will be more likely to overlap with the Bluetooth transceiving process. Another data re-sent with a lower data rate than that of the prior re-sent would be further attempted, causing more overlap with the Bluetooth transceiving process than the prior attempt. As a result, WLAN throughput is highly damaged as the WLAN and Bluetooth wireless communication services sharing a single antenna.

BRIEF SUMMARY OF THE INVENTION

In light of the previously described problems, there exists a need for a method and system, in which interference may be reduced between a plurality of wireless communication modules sharing a single antenna for simultaneous operations.

One aspect of the invention discloses a wireless communications system, comprising a first wireless communications module and a second wireless communications module. The first wireless communications module is configured to transmit or receive a first wireless signal in a first frequency band selected from a first frequency range. The second wireless communications module is configured to transmit or receive a second wireless signal in a second frequency band selected from a second frequency range, and adjust a transmission power of the second wireless signal in response to that a frequency offset between the first frequency band and the second frequency band falls within a predetermined range.

Another aspect of the invention discloses a method for reducing interference between a plurality of wireless communications modules in a wireless communications device, comprising: transmitting or receiving a first wireless signal in a first frequency band selected from a first frequency range by a first wireless communications module, and transmitting or receiving a second wireless signal in a second frequency band selected from a second frequency range by a second wireless communications module; determining whether a frequency offset between the first frequency band and the second frequency band is within a predetermined range; and adjusting a transmission power of the second wireless signal in response to that the frequency offset between the first frequency band and the second frequency band is within the predetermined range.

Another aspect of the invention discloses another wireless communications system, comprising a first wireless communications module and a second wireless communications module. The first wireless communications module is configured to transmit or receive a plurality of first wireless signals. The second wireless communications module is configured to transmit or receive a plurality of second wireless signals, and adjust a transmission power of the second wireless signals in response to that a signal indicator of the first or second wireless signals meets a predetermined criterion.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
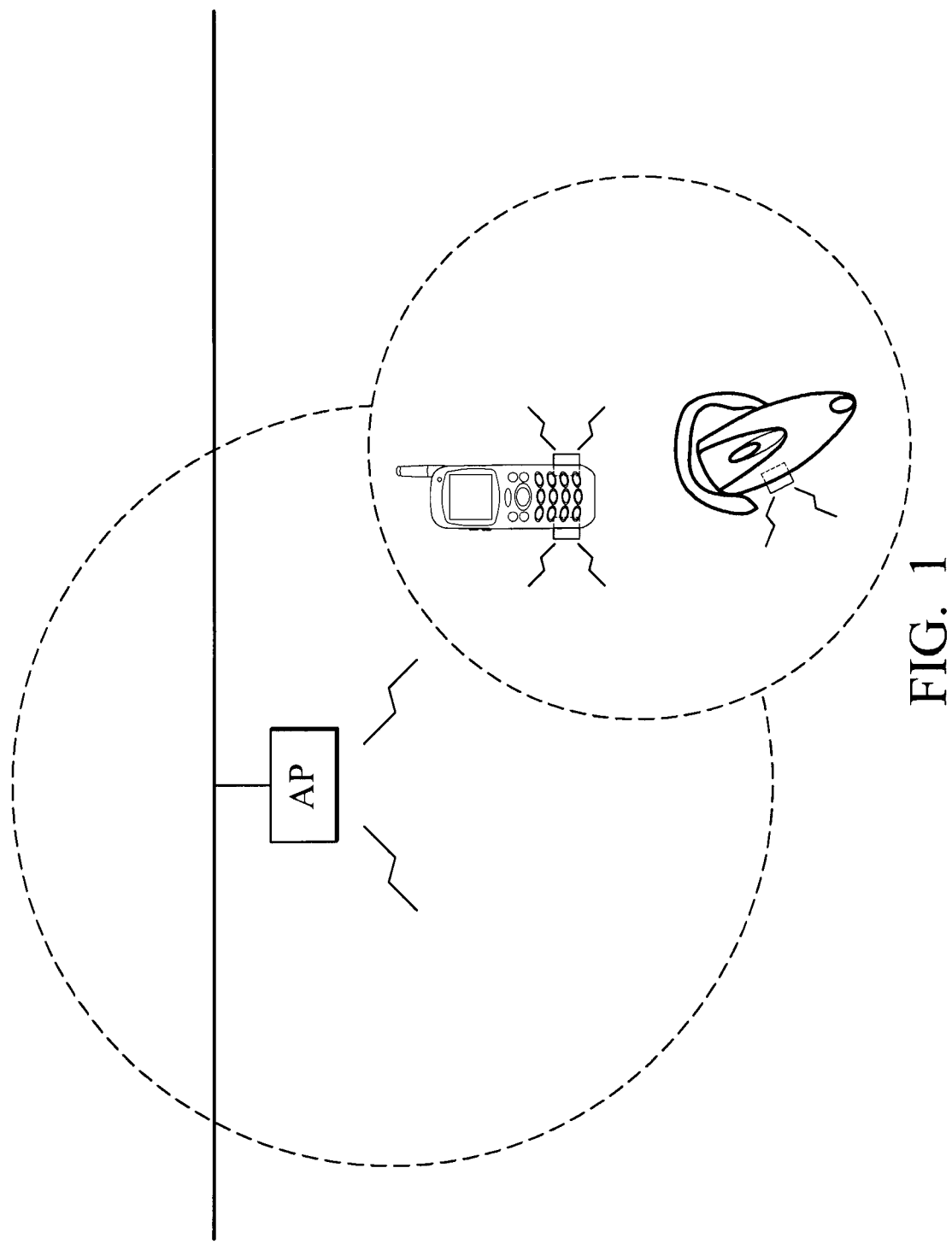
FIG. 1 shows a cellular phone connecting to a Wireless Local Area Network (WLAN) via a WLAN module thereof as well as communicating with a Bluetooth handset through a Bluetooth module thereof.
Figure 2:
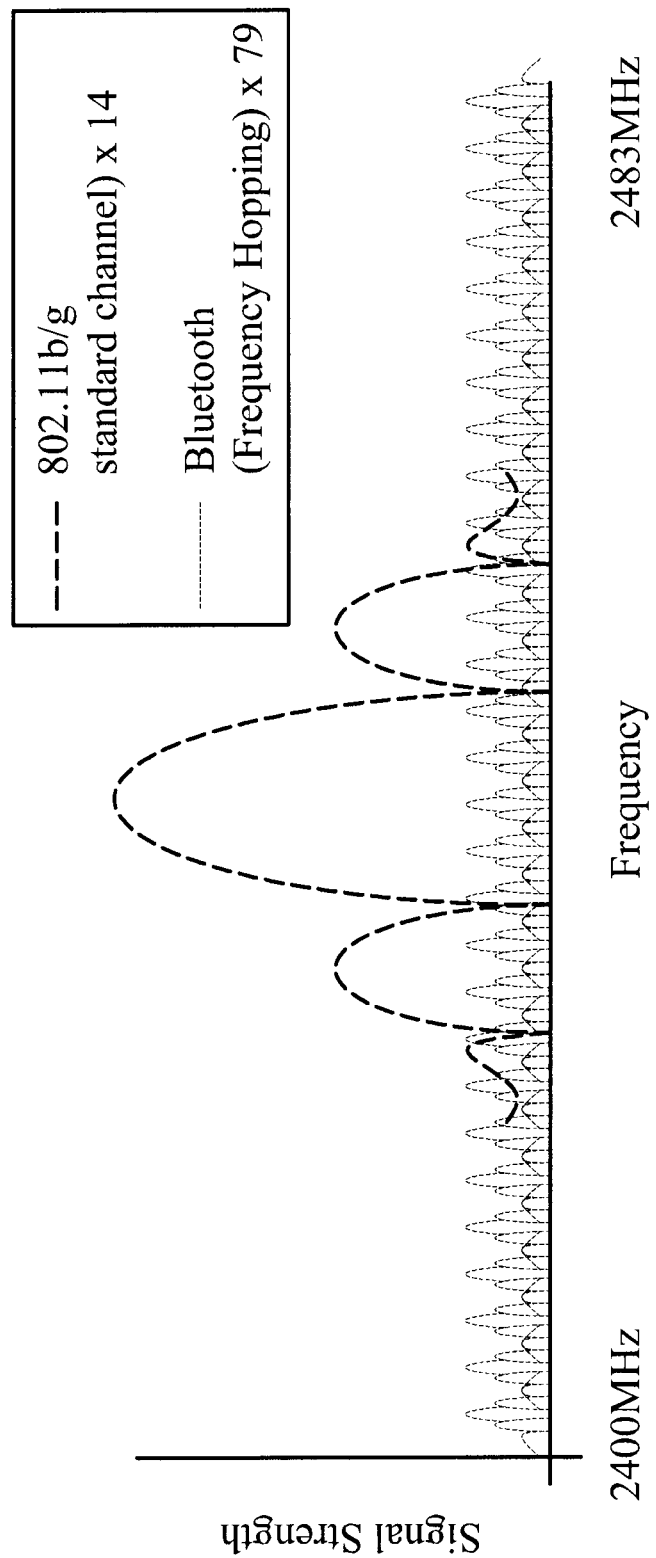
FIG. 2 shows a diagram of Bluetooth frequency Hopping.
Figure 3:
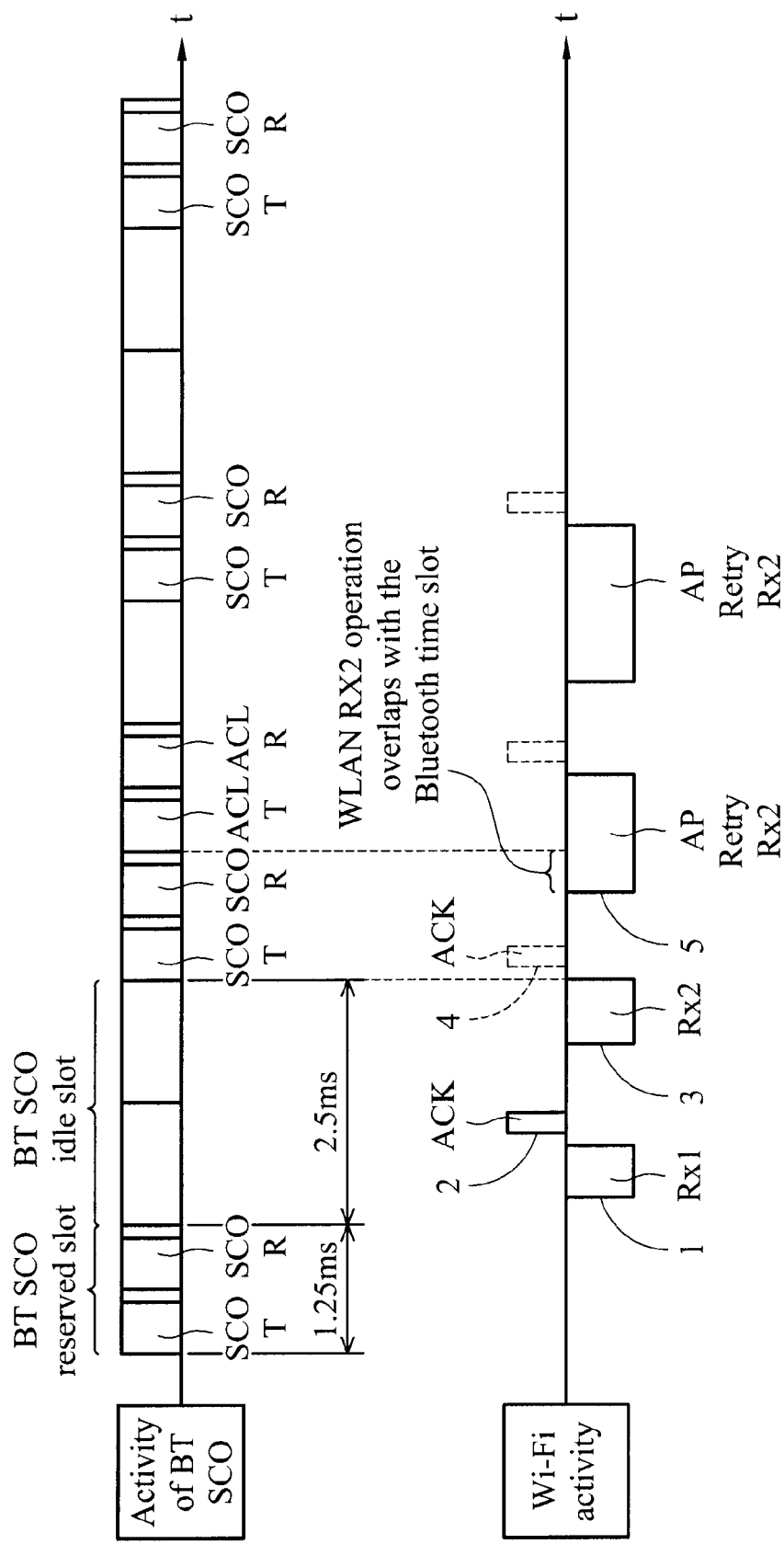
FIG. 3 shows a diagram illustrating an operation conflict between a WLAN and a Bluetooth wireless communication services sharing a single antenna.
Figure 4:
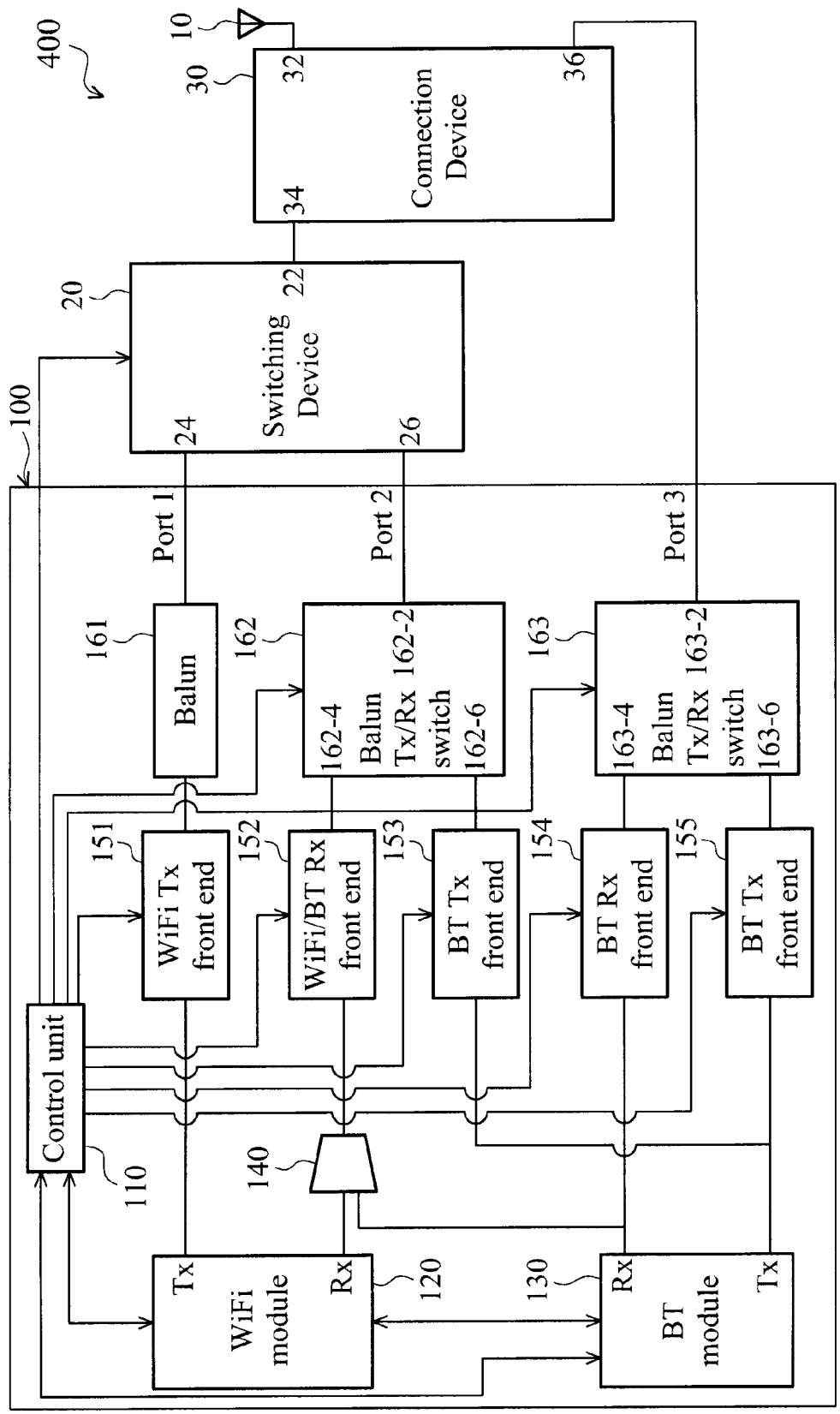
FIG. 4 shows a diagram illustrating a system for the coexistence between two wireless communications modules sharing a single antenna in accordance with an embodiment of the invention.

FIG. 4 shows a diagram illustrating a system for the coexistence between two wireless communications modules sharing a single antenna in accordance with an embodiment of the invention. The system 400 comprises an antenna 10, a switching device 20, a connection device 30 and a wireless communications chipset 100. The wireless communications chipset 100 comprises a control unit 110, a WiFi module 120, a BT module 130, a separator 140, a WiFi Tx front-end 151, a WiFi/BT Rx front-end 152, BT Tx front-ends 153 and 155, a BT Rx front-end 154, a balun unit 161, and balun-switch units 162 and 163. Each of the balun unit 161 and the balun-switch units 162 and 163 comprises a balun that is used to convert electrical signals that are balanced with respect to ground (differential) into signals that are unbalanced (single-ended) and vice versa. The balun unit 161 is connected as an input/output (I/O) port (port 1) of the wireless communications chipset 100. The balun-switch units 162 and 163 serve as another I/O ports (ports 2 and 3) of the wireless communications chipset 100. The switching device 20 and the connection device 30 may be integrated as a path selection circuit and disposed on a printed circuit board (PCB).

The WiFi module 120 is connected with the BT module 130 for communicating operation statuses and power control information to each other, so that the transmission power of either the WiFi module 120 or the BT module 130 may be adjusted to reduce the signal interference to the other of the WiFi module 120 and the BT module 130. The WiFi Tx front-end 151 is connected to the WiFi module 120 and performs the front-end functions for transmission, such as modulation of the transmitting carrier signals. The WiFi/BT Rx front-end 152 is connected to the separator 140 and performs the front-end functions for reception, such as demodulation of the received carrier signals. The separator 140 is configured to separate the WiFi and BT Rx signals in the combined signals from the WiFi/BT Rx front-end 152, and to direct the separated WiFi and BT Rx signals to the WiFi module 120 and the BT module 130, respectively. Similarly, both of the BT Tx front-ends 153 and 155 are connected to the BT module 130 and perform the front-end functions for transmission, and the BT Rx front-end 154 is connected to the BT module 130 and performs the front-end functions for reception. The operation states of the WiFi Tx front-end 151, the WiFi/BT Rx front-end 152, the BT Tx front-end 153, the BT Rx front-end 154, and the BT Tx front-end 155 are controlled by the control unit 110. By setting the operation state to "ON", the corresponding front-end unit will be activated. On the contrary, by setting the operation state to "OFF", the corresponding front-end unit will be deactivated. Or, alternatively, the operation state may be set to "DOWN" so that the corresponding front-end unit operates in an idle mode in which most of circuits are shut down and a low-rate clock is working to reduce power consumption. It is to be understood that, when any front-end unit is set to "OFF" or "DOWN", the corresponding transmission or reception capability is loss. The control unit 110 may also operate as a packet traffic arbitrator (PTA) to receive the traffic requests from both of the WiFi module 120 and the BT module 130, and to determine whether the WiFi traffic request has collided with the BT traffic request in a time period. If a collision has occurred, the control unit 110 may grant both of the traffic requests or may only grant one of the traffic requests while rejecting the other, depending on the frequency bands, priorities, operation types (e.g. Tx/Rx operation), power levels or others parameters of the traffic requests. Additionally, the control unit 110 further controls the switch device 20 to connect the terminal 22 to the terminal 24 or 26, the balun-switch unit 162 to connect the terminal 162-2 to the terminal 162-4 or 162-6, and the balun-switch unit 163 to connect the terminal 163-2 to the terminal 163-4 or 163-6. Accordingly, by controlling the switch device 20, the balun-switch unit 162, and the balun-switch unit 163, and controlling the operation states of the WiFi Tx front-end 151, the WiFi/BT Rx front-end 152, the BT Tx front-end 153, the BT Rx front-end 154, and the BT Tx front-end 155, the control unit 110 determines the antenna path of the WiFi module 120 and the BT module 130. It is to be understood that the control unit 110 may be integrated into the WiFi module 120 or the BT module 130 to reduce hardware costs.

Figure 5A:
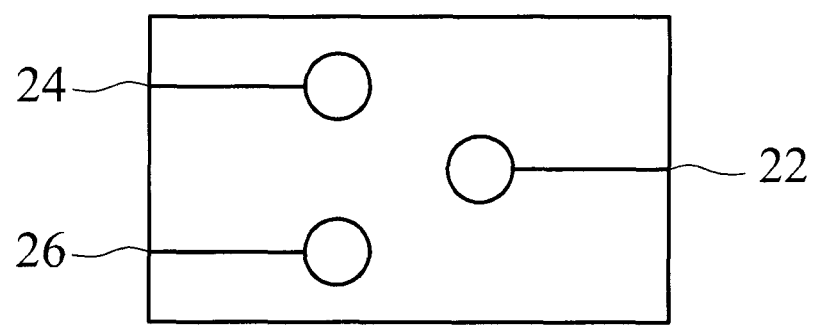
FIG. 5A shows a diagram illustrating a switching device implemented by a single-pole double-thrown (SPDT) switch in accordance with an embodiment of the invention.
Figure 5B:
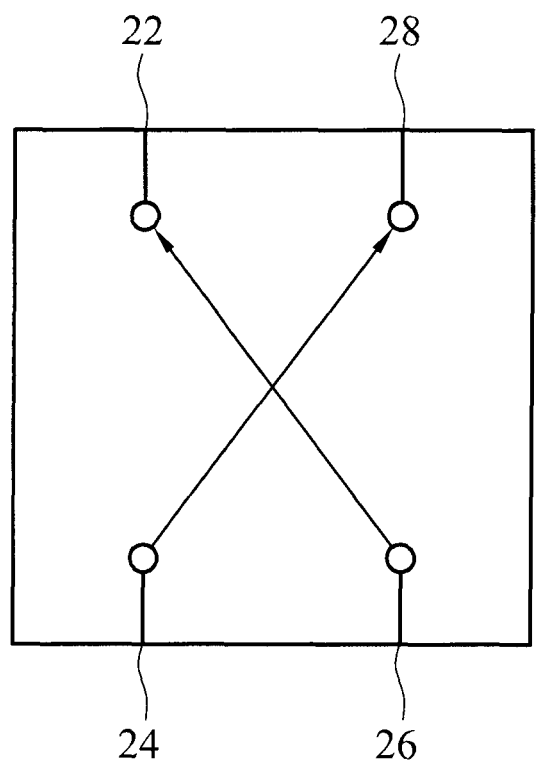
FIG. 5B shows a diagram illustrating a switching device implemented by a double-pole double-thrown (DPDT) switch in accordance with an embodiment of the invention.

The switching device 20 may be implemented by a single-pole double-thrown (SPDT) switch, which consists of three terminals 22, 24 and 26 and is configured to selectively connect the terminal 22 to the terminal 24 and 26, as shown in FIG. 5A. In addition, the terminals 24 and 26 are connected to the ports 1 and 2 of the wireless communications chipset 100, respectively. In other embodiments, the switching device 20 may also be implemented by a double-pole double-thrown (DPDT) as shown in FIG. 5B. The terminal 24 is selectively connected to the terminals 22 or 28, and the terminal 26 is selectively connected to the terminals 22 or 28. The terminal 28 may be coupled or connected to an external node for impedance matching.

Figure 6A:
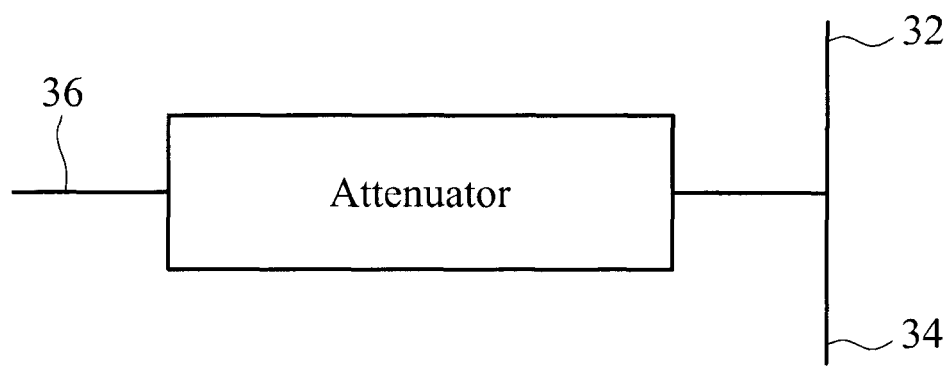
FIG. 6A shows a connection device implemented using an attenuator in accordance with an embodiment of the invention.
Figure 6B:
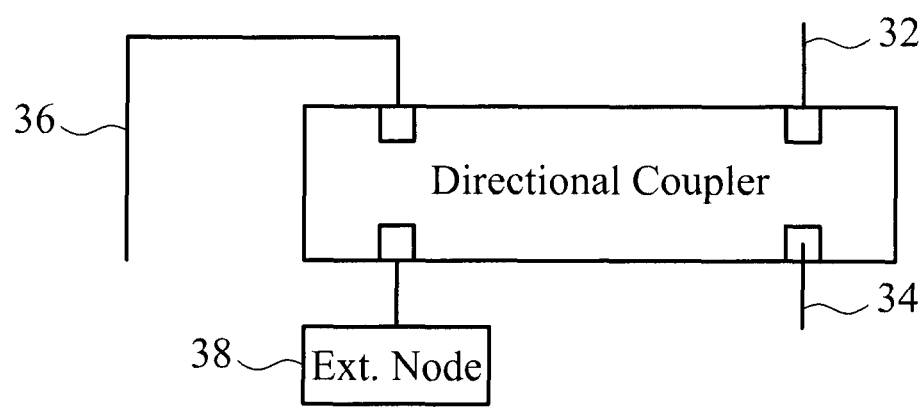
FIG. 6B shows a connection device implemented using a directional coupler in accordance with an embodiment of the invention.

The connection device 30 consists of three ports 32, 34 and 36 and is configured to couple the ports 32 and 34 to form a transceiving path (through path), and to couple the ports 32 and 36 to form another transceiving path (coupled path), wherein the port 34 is isolated from the port 36 by substantially 20 dB and the electrical signals passing through the path between ports 32 and 36 are substantially attenuated by 6 or 10 dB. Referring to FIG. 6A, the connection device 30 may contain an attenuator attenuating electrical signals passing through the ports 32 and 36 by 20 dB. Alternatively, the connection device 30 may contain a directional coupler, as shown in FIG. 6B, in which the ports 32 and 34 are coupled as a through path, the port 36 and an external node 38 are connected as a through path, the ports 32 and 36 are coupled as a coupled path, and the ports 34 and 36 are isolated with a loss around 20-40 dB. The through path is direct or indirect through and the external node 38 may be a resistor (for example, a 50Ω resistor or a 50Ω equivalent termination). It is noted that the through path between the ports 32 and 34 may have a loss of 0.5 dB substantially while the coupled path between ports 32 and 36 may have a loss of 10 dB substantially, or the through path between ports 32 and 34 may have a loss of 1.2 dB substantially while the coupled path between ports 32 and 36 may have a loss of 6 dB substantially.

Figure 7A:
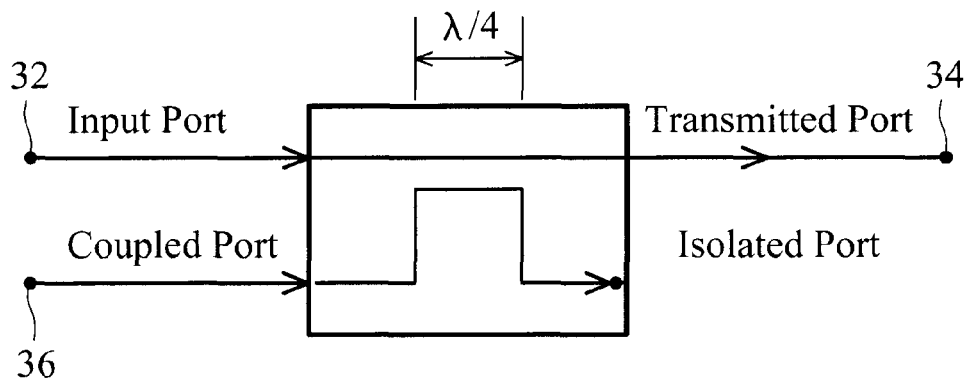
FIGS. 7A and 7B show the configurations of a connection device in accordance with an embodiment of the invention.
Figure 7B:
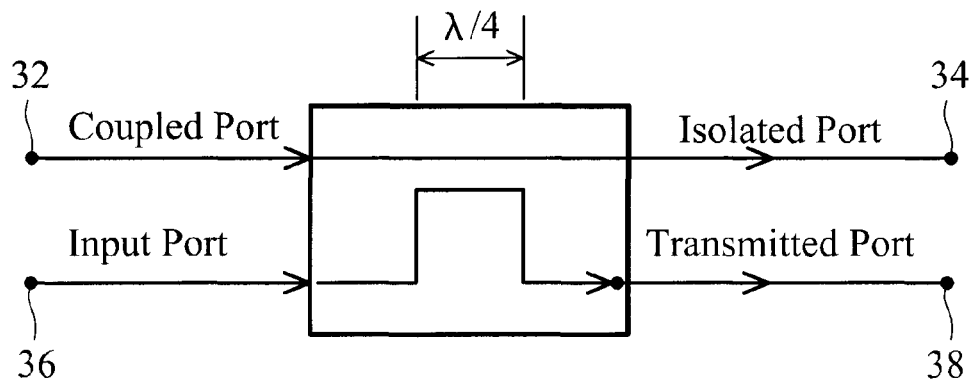

FIG. 7A and FIG. 7B illustrate two embodiments of the directional coupler shown in FIG. 6B. Referring to FIG. 7A, two transmission lines are set sufficiently close together, such that electrical signals (or energy) directed from the port 32 (connected to a port called an input port) to the port 34 (connected to a port called a transmitted port) is coupled to the port 36 (connected to a port called a coupled port). Similarly, referring to FIG. 7B, electrical signals (or energy) directed from the ports 36 (connected to a port called an input port) to a transmitted port (such as port 38 in FIG. 6B) is coupled to the port 32 (connected to a port called a coupled port) and isolated from the port 34 (connected to a port called an isolated port), such that the coupled signals can be added to electrical signals passing between the ports 32 and 34.

In addition to the attenuator (FIG. 6A) and the directional coupler (FIG. 6B), the connection device 30 may be implemented in a power divider, in which the ports 34 and 36 are isolated and both have a loss of 3 dB ideally (3.5 dB in practice). Furthermore, the connection device 30 may be implemented in a power splitter. The structure of the power splitter is similar to the power divider, but with different losses between the output ports. For a power splitter, the losses of the ports 34 and 36 are different. For example, the port 36 may have a loss of 10 dB while the port 34 may have a loss of 0.5 dB, or the port 36 may have a loss of 6 dB while the port 34 may have a loss of 1 dB. In addition, the connection device 30 may be implemented by a PCB pad with an input port and two output ports, in which one of the output ports has a loss of NdB and another output port has a loss of smaller than 1 dB, as designed based on requirement. It is noted that the power splitter may be implemented using a directional coupler, such as the one shown in FIG. 6B, with the port 38 connected to a resistor for impedance matching and ports 34 and 36 being isolated. With the power splitter implemented using a directional coupler as shown in FIG. 6B, the port 36 may have a loss of 10 dB while the port 34 may have a loss of 0.5 dB, or the port 36 may have a loss of 6 dB while the port 34 may have a loss of 1 dB.

Figure 8A:
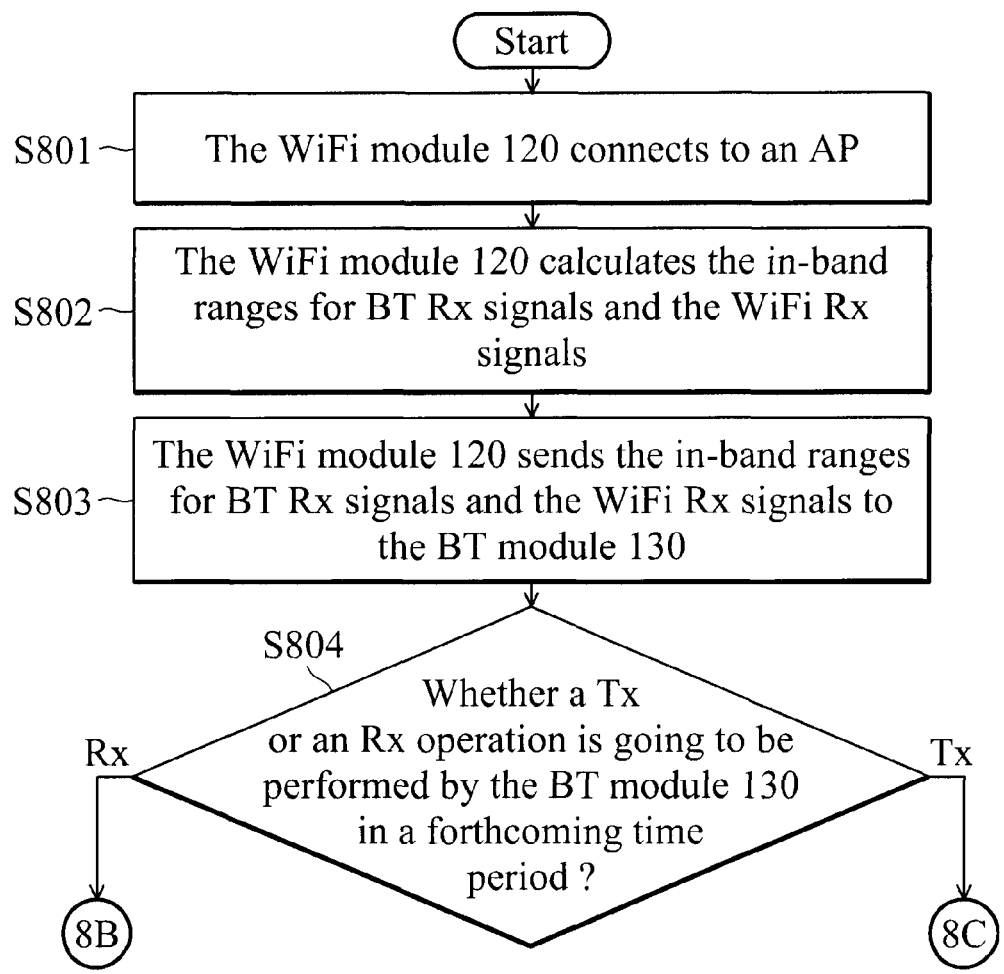
FIGS. 8A to 8C show a flowchart of the method for reducing interference between WiFi and the BT modules in accordance with an embodiment of the invention.
Figure 8B:
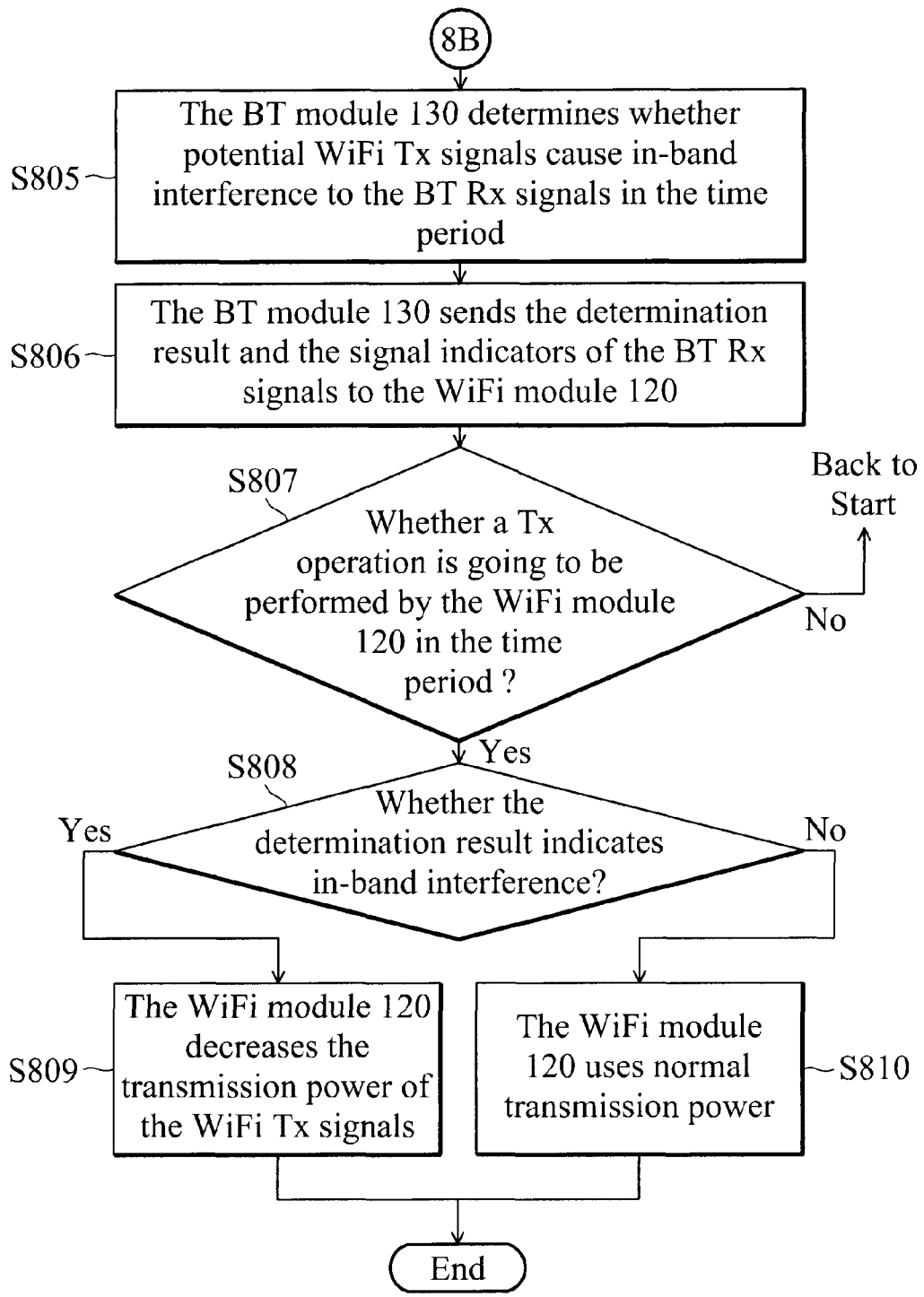
Figure 8C:
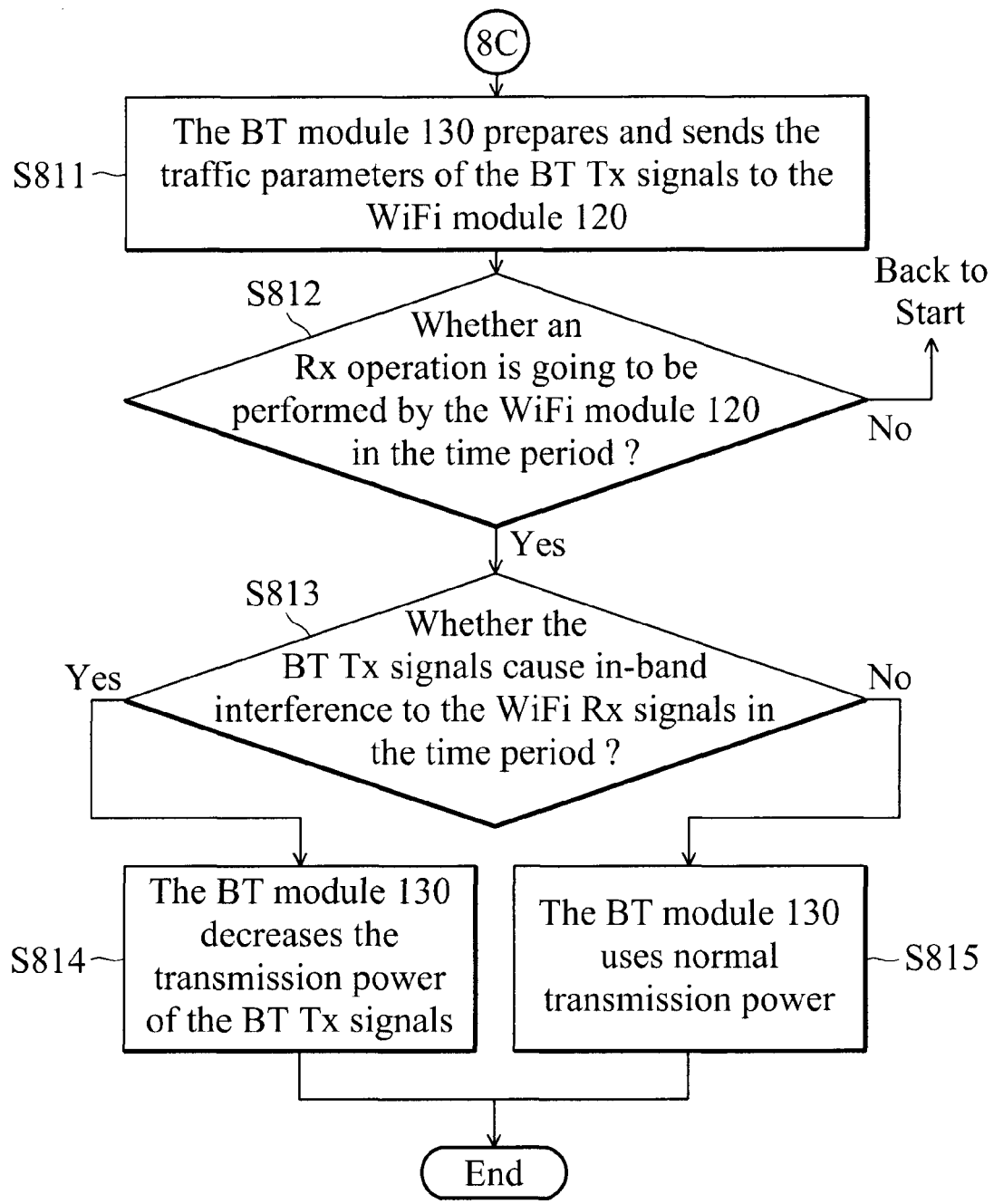

FIGS. 8A to 8C show a flowchart of the method for reducing interference between the WiFi module 120 and the BT module 130 in accordance with an embodiment of the invention. Although the flow is explained with reference to the system 400 as shown in FIG. 4, the present invention is not limited thereto. Other antenna structures or transceiver configurations capable of conducting co-existence of two or more communications modules can be applied as well. To begin, the WiFi module 120 determines the frequency band for transmitting and receiving WiFi signals when connected to an AP (step S801). The WiFi module 120 may determine the frequency band when connected to the AP with reference to a channel table. In some conditions, such as WiFi module 120 is configured to comply with 802.11n specification, the WiFi module 120 determines the frequency band with a primary channel and a secondary channel. When the frequency band is determined, the WiFi module 120 calculates the in-band ranges for the BT Rx signals and the WiFi Rx signals (step S802), wherein the in-band ranges for the BT Rx signals and the WiFi Rx signals indicate the frequency ranges where the BT Rx signals and the WiFi Rx signals may have in-band interference caused by the WiFi Tx signals and the BT Tx signals, respectively, as will be further illustrated in FIGS. 9A and 9B. In one embodiment, the in-band interference may be caused when both of the WiFi signals and the BT signals are transmitted or received in the same frequency; while in other embodiments, the in-band interference may be caused when the WiFi signals and the BT signals are transmitted or received in nearby frequencies. By calculating the in-band ranges for the BT Rx signals and the WiFi Rx signals, the WiFi module 120 may generate two channel bitmaps which indicate the in-band ranges for the BT Rx signals, wherein one channel bitmap indicates which channels carrying BT Rx signals may have in-band interference caused by the WiFi Tx signals in the primary channel, and the other channel bitmap indicates which channels carrying BT Rx signals may have in-band interference caused by the WiFi Tx signals in the secondary channel. Likewise, the WiFi module 120 may generate two channel bitmaps which indicate the in-band ranges for the WiFi Rx signals, wherein one channel bitmap indicates which channels carrying BT Tx signals may cause in-band interference to the WiFi Rx signals in the primary channel, and the other channel bitmap indicates which channels carrying BT Tx signals may cause in-band interference to the WiFi Rx signals in the secondary channel. Subsequently, the WiFi module 120 sends the in-band ranges for the WiFi Rx signals and the BT Rx signals to the BT module 130 (step S803). When the in-band ranges for the WiFi Rx signals and the BT Rx signals from the WiFi module 120 are received, it is determined whether an Rx operation or a Tx operation is going to be performed by the BT module 130 in a forthcoming time period (step S804). If the BT module 130 occupies the time period for an Rx operation, the BT module 130 determines whether in-band interference may be caused to the BT Rx signals by potential WiFi Tx signals in the time period according to the in-band range for the BT Rx signals and the traffic pattern of the BT Rx signals (step S805). In one embodiment, the BT module 130 may determine whether there may be in-band interference by checking if any one of the next N hopped channels used by the BT Rx signals is in the in-band range for the BT Rx signals. That is, if one of the next N hopped channels used by the BT Rx signals is in the frequency band or near the frequency band of the WiFi Tx signals, then in-band interference may be caused to the BT Rx signals by potential WiFi Tx signals. After determining whether in-band interference may be caused, the BT module 130 sends to the WiFi module 120, the determination result, and the signal indicators of the BT Rx signals (step S806). In one embodiment, the BT module 130 may also send the traffic pattern information of the BT Rx signals to the WiFi module 120, including the starting time, duration, and repeating interval of the BT Rx signals. When the determination result is received, it is determined whether a Tx operation is going to be performed by the WiFi module 120 in the time period (step S807). If so, the WiFi module 120 adjusts the transmission power of the WiFi Tx signals according to the determination result and the signal indicators of the BT Rx signals and the WiFi Tx signals. To be more specific, it is first determined whether the determination result indicates that in-band interference may be caused (step S808). If the determination result indicates to the WiFi module 120 that the WiFi Tx signals may cause in-band interference to the BT Rx signals, the WiFi module 120 decreases the transmission power of the WiFi Tx signals according to the signal indicators of the BT Rx signals and the WiFi Tx signals, so that the BT Rx signals may be successfully received (step S809). Additionally, the WiFi module 120 may further determine when to decreases the transmission power of the WiFi Tx signals according to the traffic pattern information of the BT Rx signals. Otherwise, if the determination result indicates to the WiFi module 120 that the WiFi Tx signals do not cause in-band interference to the BT Rx signals, the WiFi module 120 may use normal power to transmit the WiFi Tx signals (step S810). Subsequent to step S807, if not, the process goes back to wait for the next upcoming traffic requests from the WiFi module 120 and the BT module 130. The signal indicators of the BT Rx signals and the WiFi Tx signals may include received signal strength indication (RSSI), signal to noise ratio (SNR), adjacent channel interference (ACI), packet error rate (PER), or bit error rate (BER) of the BT Rx signals and the WiFi Tx signals, respectively. In other embodiments, the transmission power of the WiFi Tx signals may also be adjusted according to the frequency offset between the frequencies or channels used by the BT Rx signals and the WiFi Tx signals, or the transceiving modulation types of the BT Rx signals and the WiFi Tx signals.

Figure 9A:
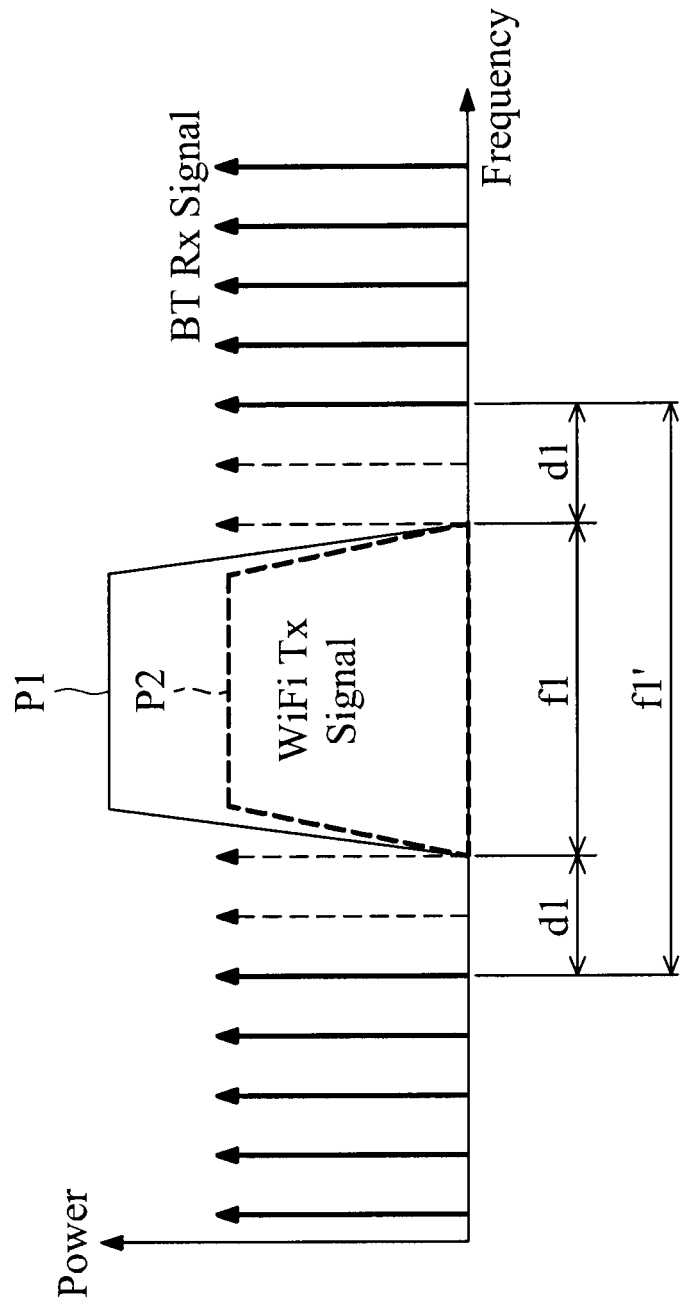
FIGS. 9A and 9B show exemplary power control of the WiFi and BT Tx signals to reduce in-band interference to the BT and WiFi Rx signals, respectively, in accordance with an embodiment of the invention.
Figure 10A:
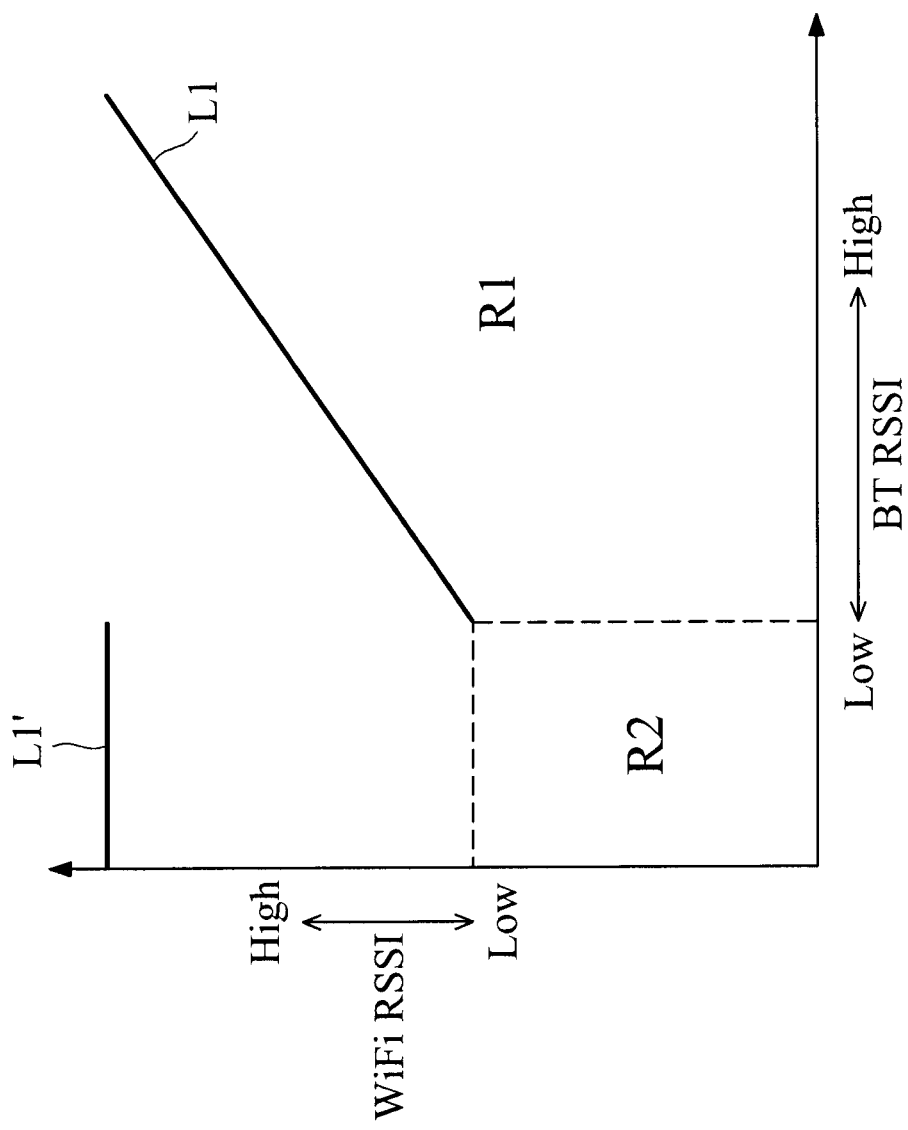
FIGS. 10A and 10B show exemplary power control of the WiFi and BT Tx signals to reduce in-band interference to the BT and WiFi Rx signals, respectively, in accordance with another embodiment of the invention.

FIG. 9A is a diagram illustrating exemplary power control of the WiFi Tx signals to reduce in-band interference to the BT Rx signals in accordance with an embodiment of the invention. As shown in FIG. 9A, the WiFi Tx signals are transmitted within the frequency range f1, and the BT Rx signals are received in a hopping frequency sequence. The adjustment of the transmission power for the WiFi Tx signals is determined according to the frequency offset between the WiFi Tx signals and the BT Rx signals. The in-band range for BT Rx signals (depicted as f1') indicates a frequency range in which in-band interference may be occurred to the BT Rx signals received with the hopped frequency being in the frequency range. The in-band range f1' may be determined according to the operational frequency ranges and the anti-interference ability of the WiFi module 120 and the BT module 130. As shown in FIG. 9A, when the hopped frequency of the BT Rx signals is not within the in-band range f1' (depicted with solid arrows as shown in FIG. 9A) or the frequency offset between the hopped frequency of the BT Rx signals and the frequency range f1 of the WiFi Tx signals is greater than d1, the WiFi module 120 may use normal transmission power P1 to transmit the WiFi Tx signals without causing in-band interference to the BT Rx signals. When the hopped frequency of the BT Rx signals is within the in-band range f1' (depicted with dashed arrows as shown in FIG. 9A) or the frequency offset between the hopped frequency of the BT Rx signals and the frequency range f1 of the WiFi Tx signals is less than or equal to d1, the WiFi module 120 may decrease the transmission power from P1 to P2 to reduce the in-band interference to the BT Rx signals. In addition, though not shown, the WiFi module 120 may further decrease the transmission power to further reduce the in-band interference to the BT Rx signals when the hopped frequency of the BT Rx signals is in f1. In addition to the frequency offset, the adjustment of the transmission power for the WiFi Tx signals may be determined according to the transmitting or receiving modulation type(s) of the WiFi Tx signals and/or the BT Rx signals. It is noted that the transmission power of the WiFi Tx signal is decreased in a way that the in-band interference to the BT Rx signals is reduced to satisfy a minimum requirement for the BT Rx signals to be successfully received by the BT module 130. For example, as shown in FIG. 10A, the region R1 represents the situation where both of the signal qualities of the WiFi and BT signals are good, i.e. both of the RSSIs of the WiFi and BT signals are greater than a threshold value, and the region R2 represents the situation where both of the signal qualities of the WiFi and BT signals are bad, i.e. both of the RSSIs of the WiFi and BT signals are less than the threshold value. In the region R1, the line L1 represents the WiFi Tx power corresponding to the RSSIs of the WiFi and BT signals, where the WiFi Tx power may be increased as the RSSI of the BT Rx signals increases and decreased as the RSSI of the BT signals decreases. The slope of the line L1 may be determined according to anti-interference ability of the WiFi module 120 and the BT module 130. In the region R2, since both of the signal qualities of the WiFi and BT signals are bad, adjusting the power of the WiFi Tx signals may not help to maintain the successful reception of the BT Rx signals, so arbitration between the traffics of the WiFi module 120 and the BT module 130 may be employed. Since arbitration is employed to make sure only one module is active for the time period, the WiFi module 120 may use the original transmission power for the WiFi Tx signals, as depicted with the line L1'. In another embodiment, the transmission power for the WiFi Tx signals may be adjusted in a hierarchical fashion. For the RSSIs of the WiFi and BT signals in a first predetermined range, the transmission power for the WiFi Tx signals may be adjusted to a first level, and for the RSSIs of the WiFi and BT signals in a second predetermined range, the transmission power for the WiFi Tx signals may be adjusted to a second level, and so on. Although the embodiments described above use the RSSIs as signal indicators for the WiFi and BT signals, other signal indicators, such as signal to noise ratios (SNR), adjacent channel interferences (ACI), packet error rates (PER), and bit error rates (BER), may be employed for determining the adjustment of the transmission power of the WiFi module 120.

Subsequent to step S804, if the BT module 130 occupies the time period for a Tx operation, the BT module 130 prepares and sends the traffic parameters of the BT Tx signals to the WiFi module 120 (step S811). The traffic parameters of the BT Tx signals may include information concerning when the BT Tx signals will be transmitted, and what power level, modulation type, and channel will be used for transmitting the BT Tx signals. When the traffic parameters of the BT Tx signals are received from the BT module 130, it is determined whether an Rx operation is going to be performed by the WiFi module 120 in the time period (step S812). If so, the BT module 130 determines whether the BT Tx signals may cause in-band interference to the WiFi Rx signals in the time period according to the in-band range for the WiFi Rx signals and the traffic parameters of the WiFi Rx signals (step S813). If so, the BT module 130 decreases the transmission power of the BT Tx signals according to the signal indicators of the WiFi Rx signals and the BT Tx signals, so that the WiFi Rx signals may be successfully received (step S814). Otherwise, if the BT Tx signals do not cause in-band ranges to the WiFi Rx signals in the time period, then normal transmission power of the BT Tx signals may be used (step S815). Subsequent to step S812, if not, the process goes back to wait for the next upcoming traffic requests from the WiFi module 120 and the BT module 130. The signal indicators of the BT Tx signals and the WiFi Rx signals may include received signal strength indication (RSSI), signal to noise ratio (SNR), adjacent channel interference (ACI), packet error rate (PER), or bit error rate (BER) of the BT Tx signals and the WiFi Rx signals, respectively. In other embodiments, the transmission power of the BT Tx signals may also be adjusted according to the frequency offset between the frequencies or channels used by the WiFi Rx signals and the BT Tx signals, or the transceiving modulation types of the WiFi Rx signals and the BT Tx signals.

Figure 9B:
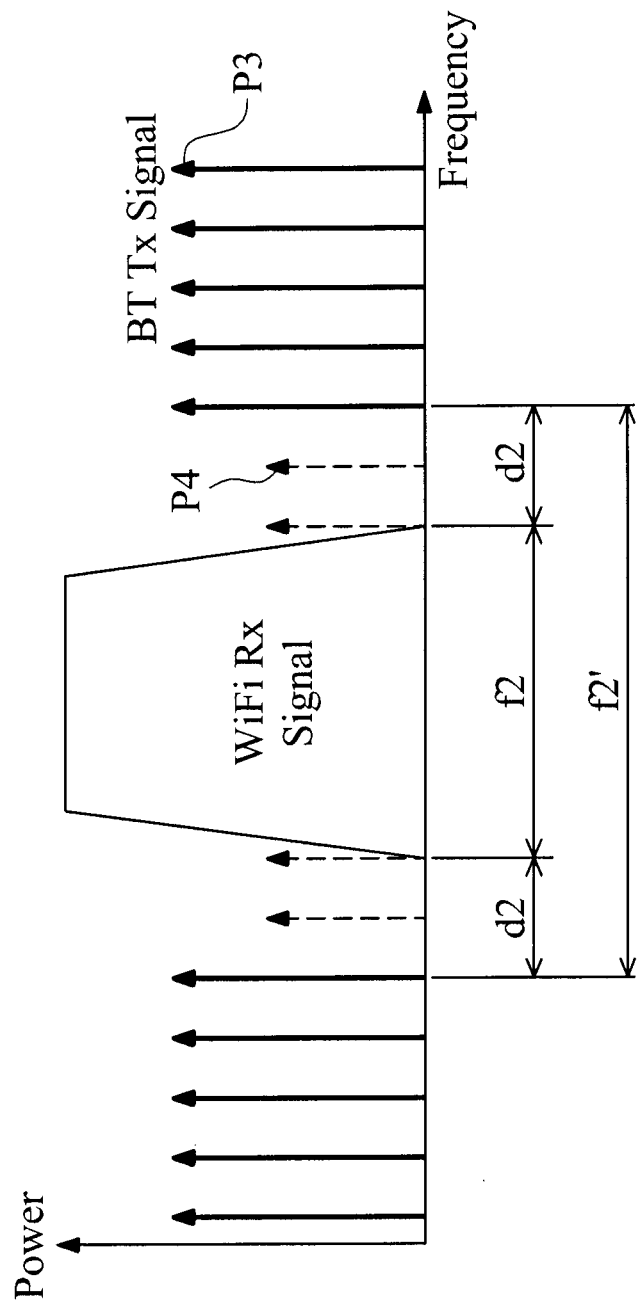
Figure 10B:
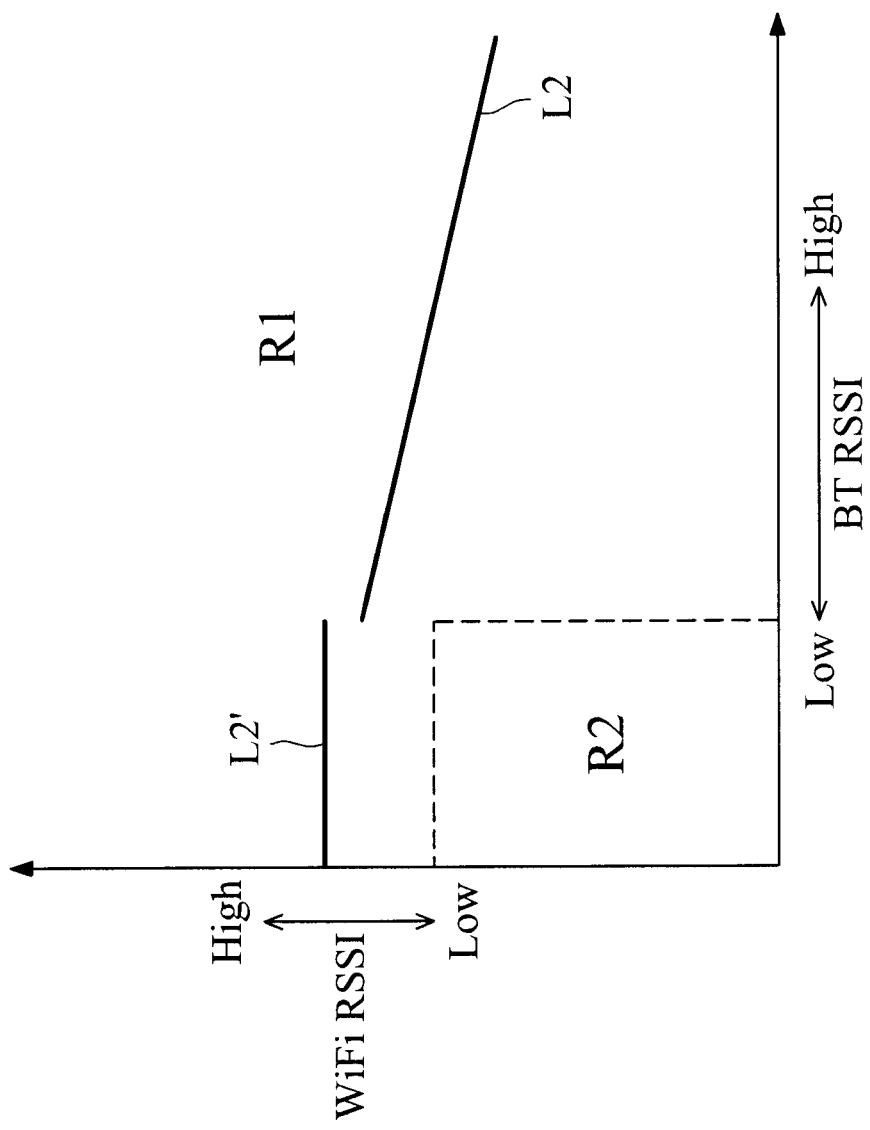

FIG. 9B is a diagram illustrating exemplary power control of the BT Tx signals to reduce in-band interference to the WiFi Rx signals in accordance with an embodiment of the invention. As shown in FIG. 9B, the WiFi Rx signals are received in the frequency range f2, and the BT Tx signals are transmitted in a hopping frequency sequence. The in-band range for the WiFi Rx signals (depicted as f2') indicates a frequency range in which in-band interference may be occurred to the WiFi Rx signals when the BT Tx signals are transmitted with the hopped frequency being in the frequency range. The in-band range f2' may be determined according to the operational frequency ranges and the anti-interference ability of the WiFi module 120 and the BT module 130. As shown in FIG. 9B, when the hopped frequency of the BT Tx signals is not within the in-band range f2' (depicted with solid arrows as shown in FIG. 9B) or the frequency offset between the hopped frequency of the BT Tx signals and the frequency range f2 of the WiFi Rx signals is greater than d2, the BT module 130 may use normal transmission power P3 to transmit the BT Tx signals without causing in-band interference to the WiFi Rx signals. When the hopped frequency of the BT Tx signals is within the in-band range f2' (depicted with dashed arrows as shown in FIG. 9B) or the frequency offset between the hopped frequency of the BT Tx signals and the frequency range f2 of the WiFi Rx signals is less than or equal to d2, the BT module 130 may decrease the transmission power from P3 to P4 to reduce the in-band interference to the WiFi Rx signals. In addition, though not shown, the BT module 130 may further decrease the transmission power to further reduce the in-band interference to the WiFi Rx signals when the hopped frequency of the BT Tx signals is in f2. In addition to the frequency offset, the adjustment of the transmission power for the BT Tx signals may be determined according to the transmitting or receiving modulation type(s) of the BT Tx signals and/or the WiFi Rx signals. It is noted that the transmission power of the BT Tx signal is decreased in a way that the in-band interference to the WiFi Rx signals is reduced to satisfy a minimum requirement for the WiFi Rx signals to be successfully received by the WiFi module 120. For example, as shown in FIG. 10B, the region R1 represents the situation where both of the signal qualities of the WiFi and BT signals are good, i.e. both of the RSSIs of the WiFi and BT signals are greater than a threshold value, and the region R2 represents the situation where both of the signal qualities of the WiFi and BT signals are bad, i.e. both of the RSSIs of the WiFi and BT signals are less than the threshold value. In the region R1, the line L2 represents the BT Tx power corresponding to the RSSIs of the WiFi and BT signals, where the BT Tx power may be decreased as the RSSI of the BT signals increases (i.e. high RSSI of the BT signals indicates that the distance to the peer communication device is short, so smaller transmission power may be used) and increased as the RSSI of the Rx signals decreases (i.e. low RSSI of the BT signals indicates that the distance to the peer communication device is long, so greater transmission power may be used). The slope of the line L2 may be determined according to the anti-interference ability of the WiFi module 120 and the BT module 130. In the region R2, since both of the signal qualities of the WiFi and BT signals are bad, adjusting the power of the BT Tx signals may not help to maintain a successful reception of the WiFi Rx signals, so arbitration between the traffics of the WiFi module 120 and the BT module 130 may be employed. Since arbitration is employed to make sure only one module is active for the time period, the BT module 130 may use the original transmission power for the BT Tx signals, as depicted with the line L2'. In another embodiment, the transmission power for the BT Tx signals may be adjusted in a hierarchical fashion. For the RSSIs of the WiFi and BT signals in a first predetermined range, the transmission power for the BT Tx signals may be adjusted to a first level, and for the RSSIs of the WiFi and BT signals in a second predetermined range, the transmission power for the BT Tx signals may be adjusted to a second level, and so on. Although the embodiments described above use the RSSIs as signal indicators for the WiFi and BT signals, other signal indicators, such as SNR, ACI, PER, and BER, may be employed for determining the adjustment of the transmission power of the BT module 130.

Figure 11A:
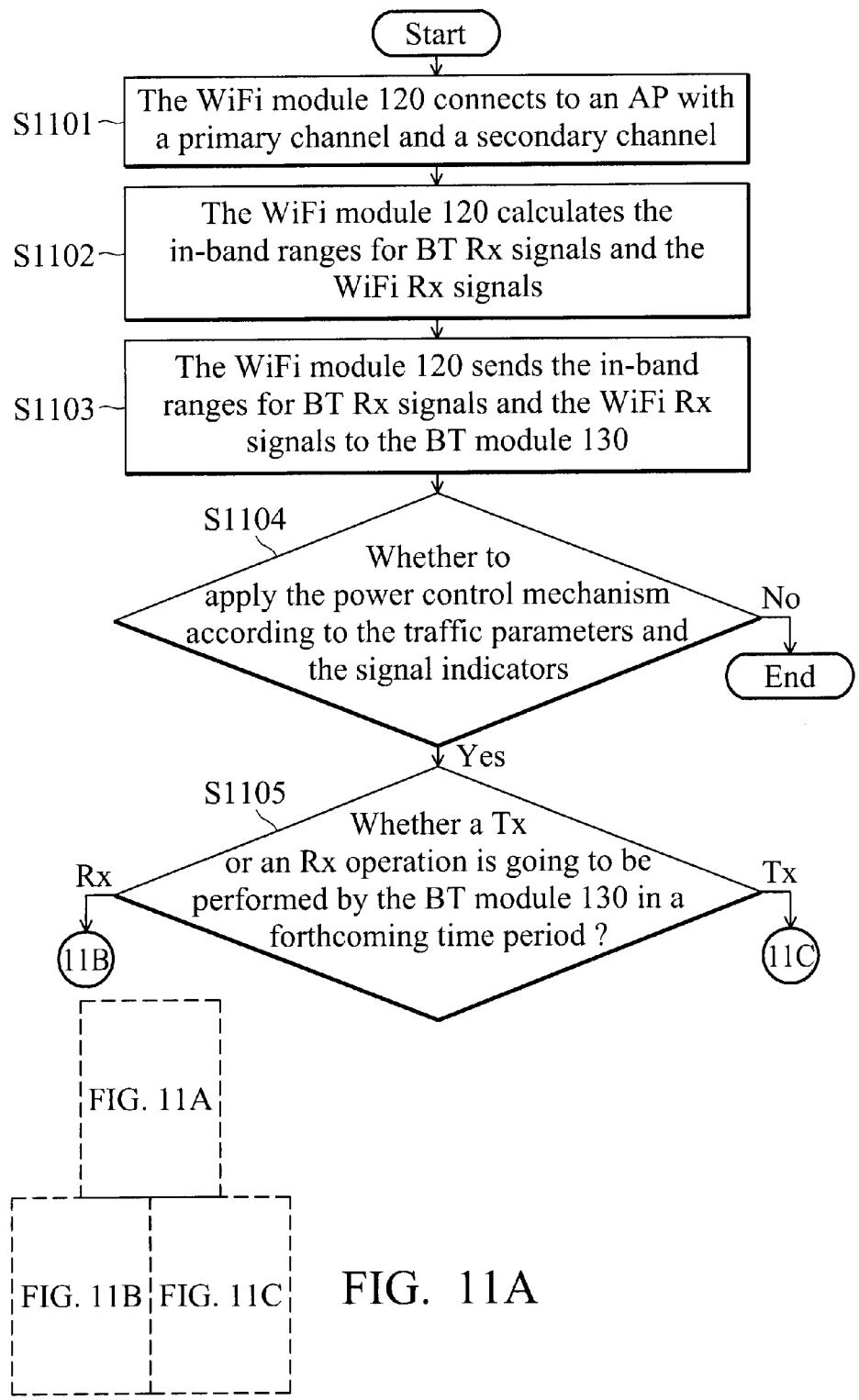
FIGS. 11A to 11C show a flowchart of the method for reducing interference between WiFi and the BT modules in accordance with another embodiment of the invention.
Figure 11B:
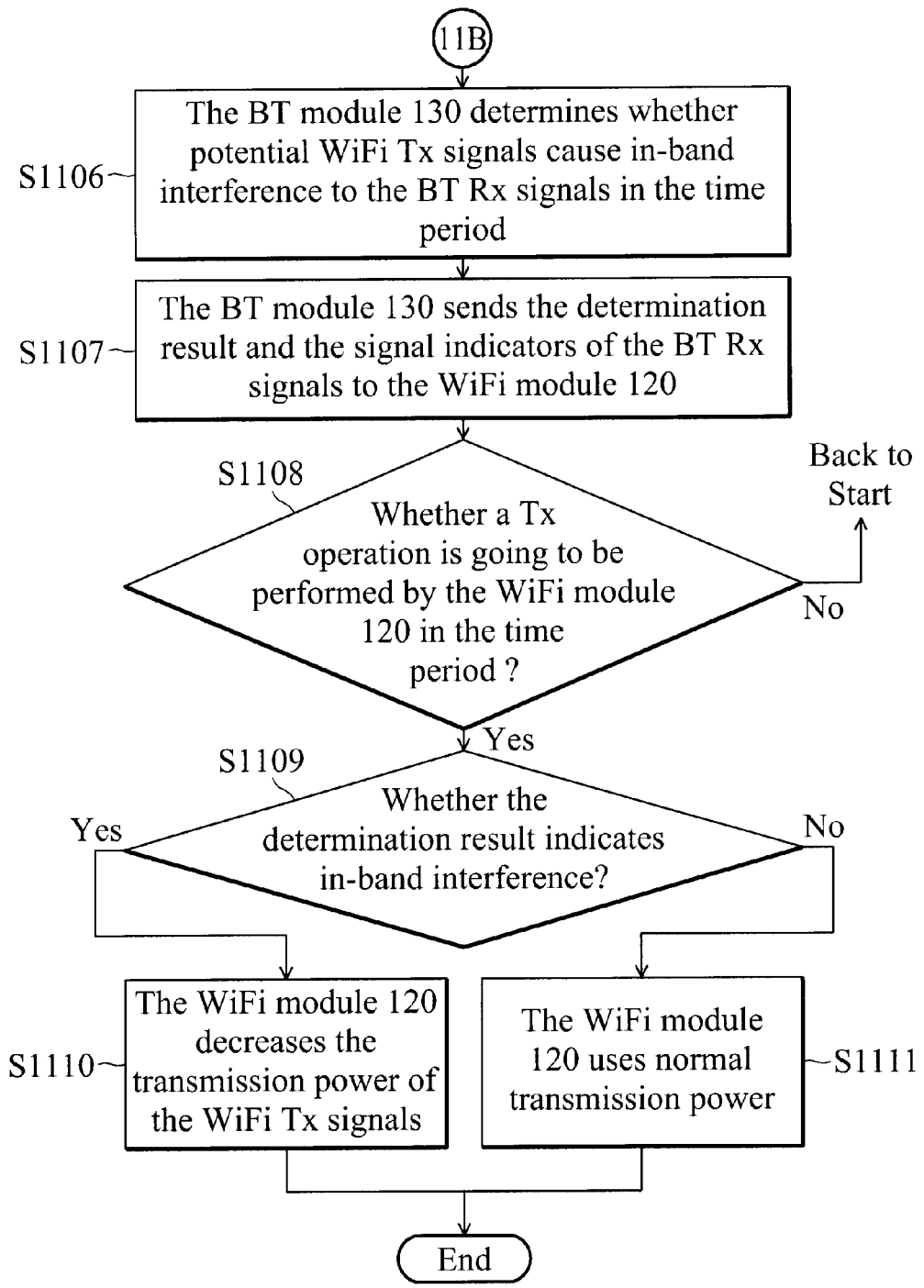
Figure 11C:
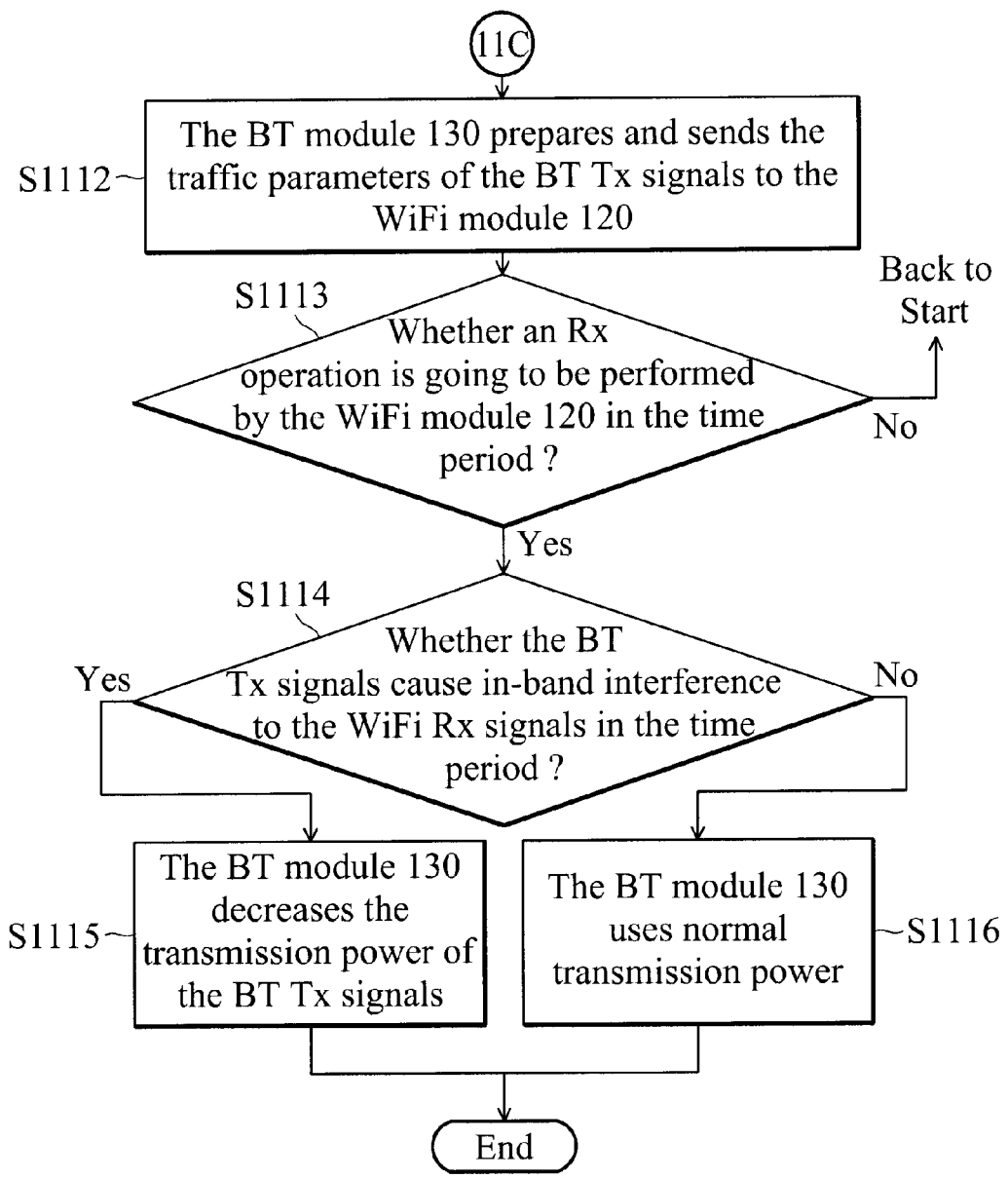
Figure 12A:
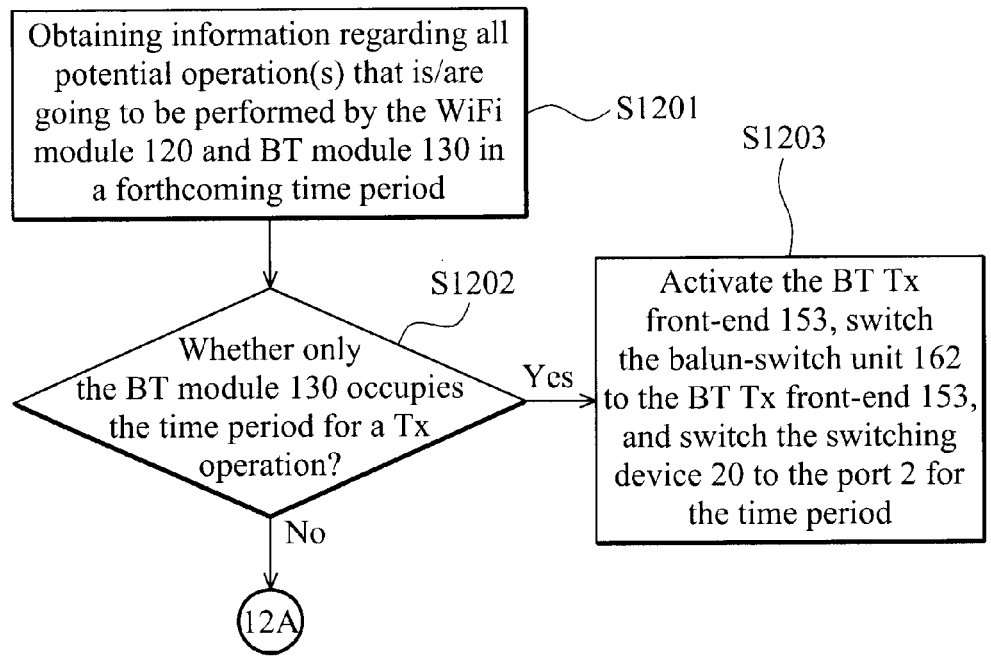
FIGS. 12A to 12G show a flowchart for handling the coexistence between WiFi and BT modules in accordance with an embodiment of the invention, based on the system of FIG. 4.
Figure 12A:
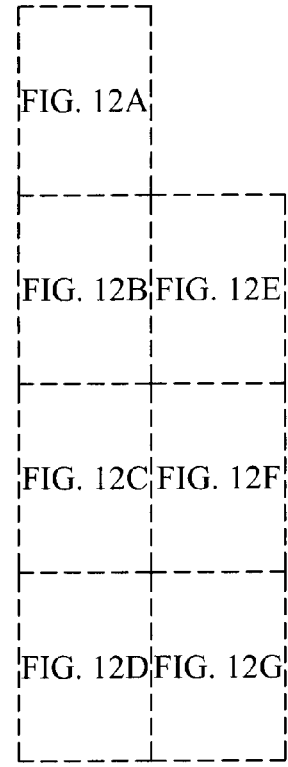
Figure 12B:
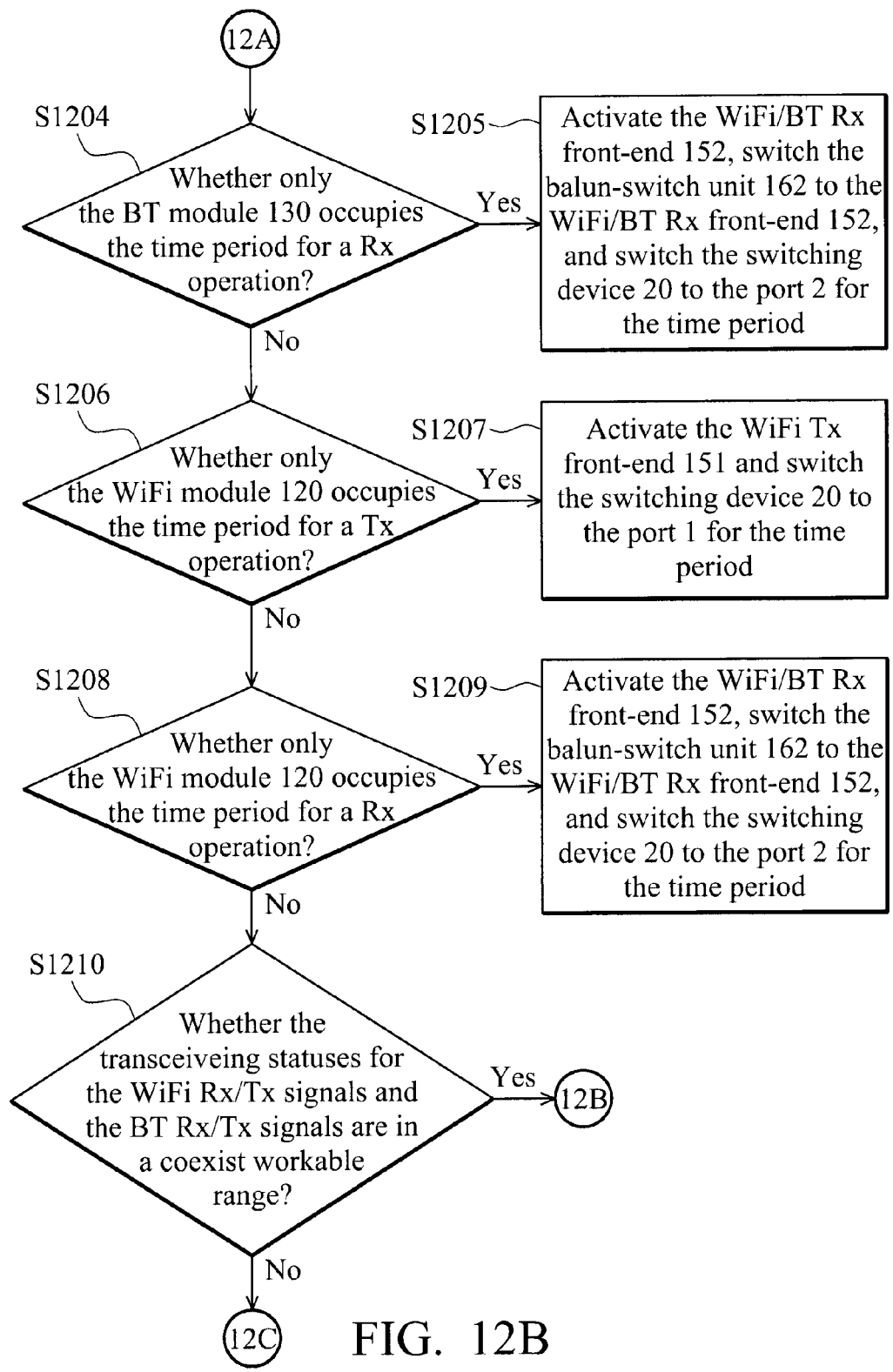
Figure 12C:
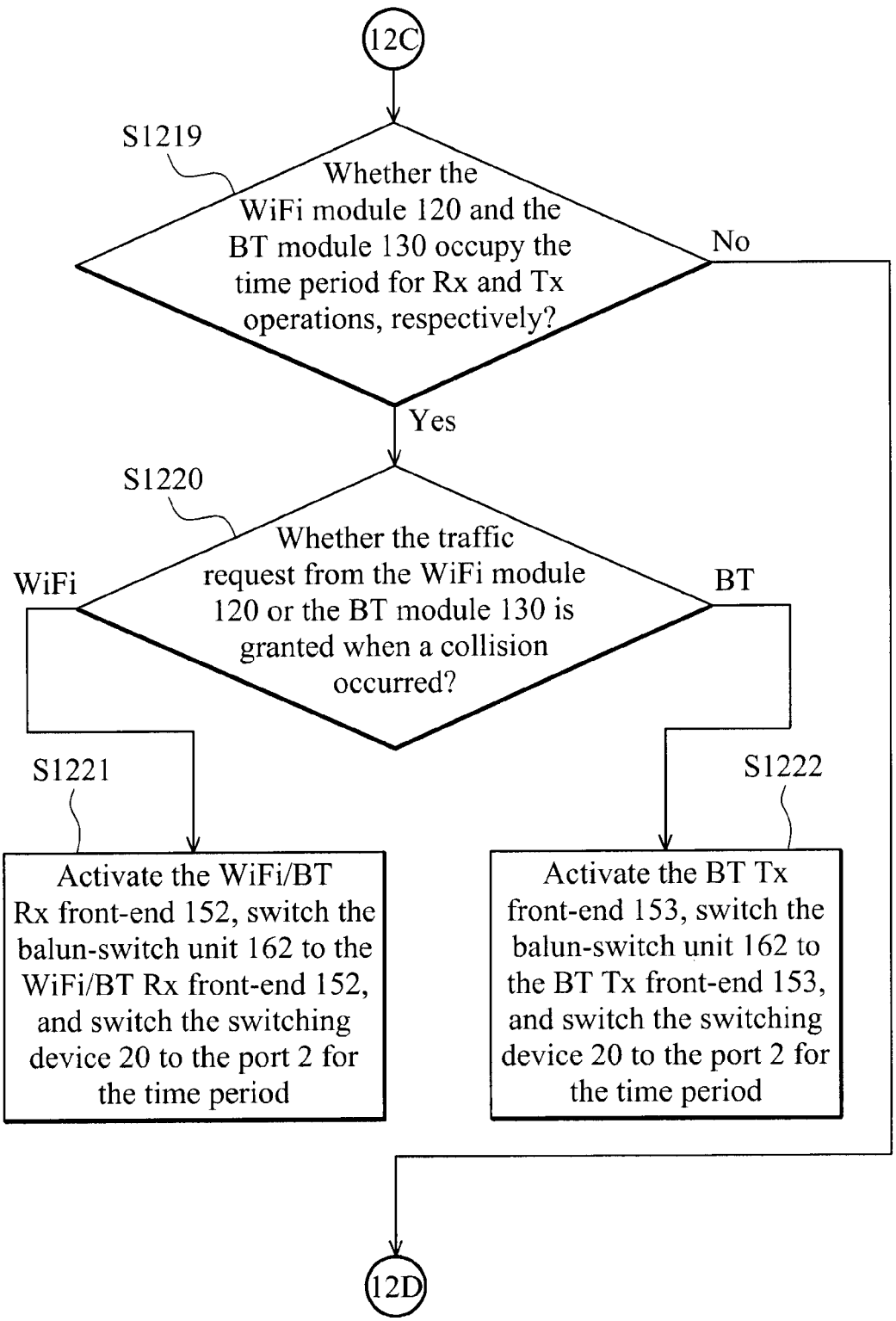
Figure 12D:
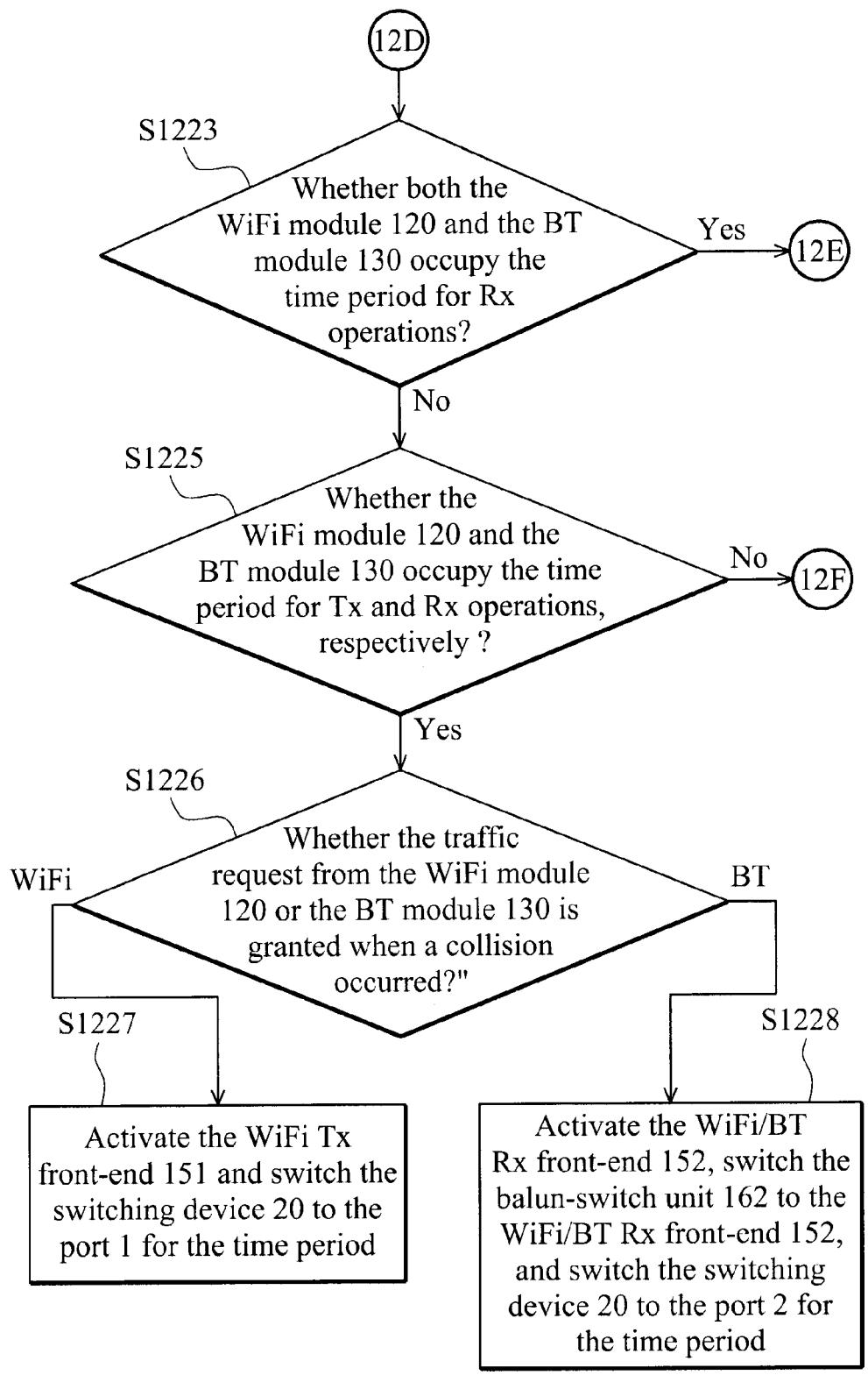
Figure 12E:
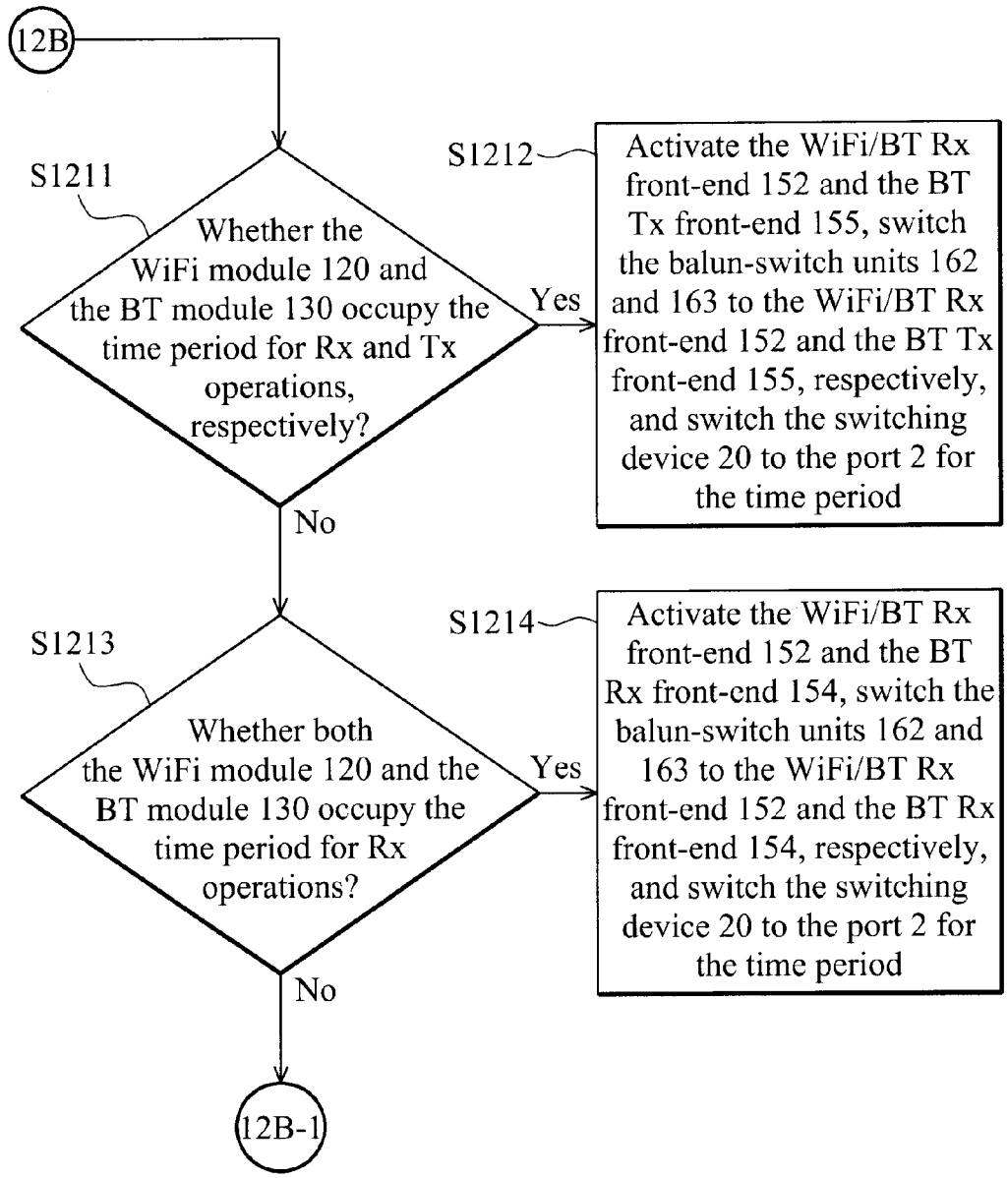
Figure 12F:
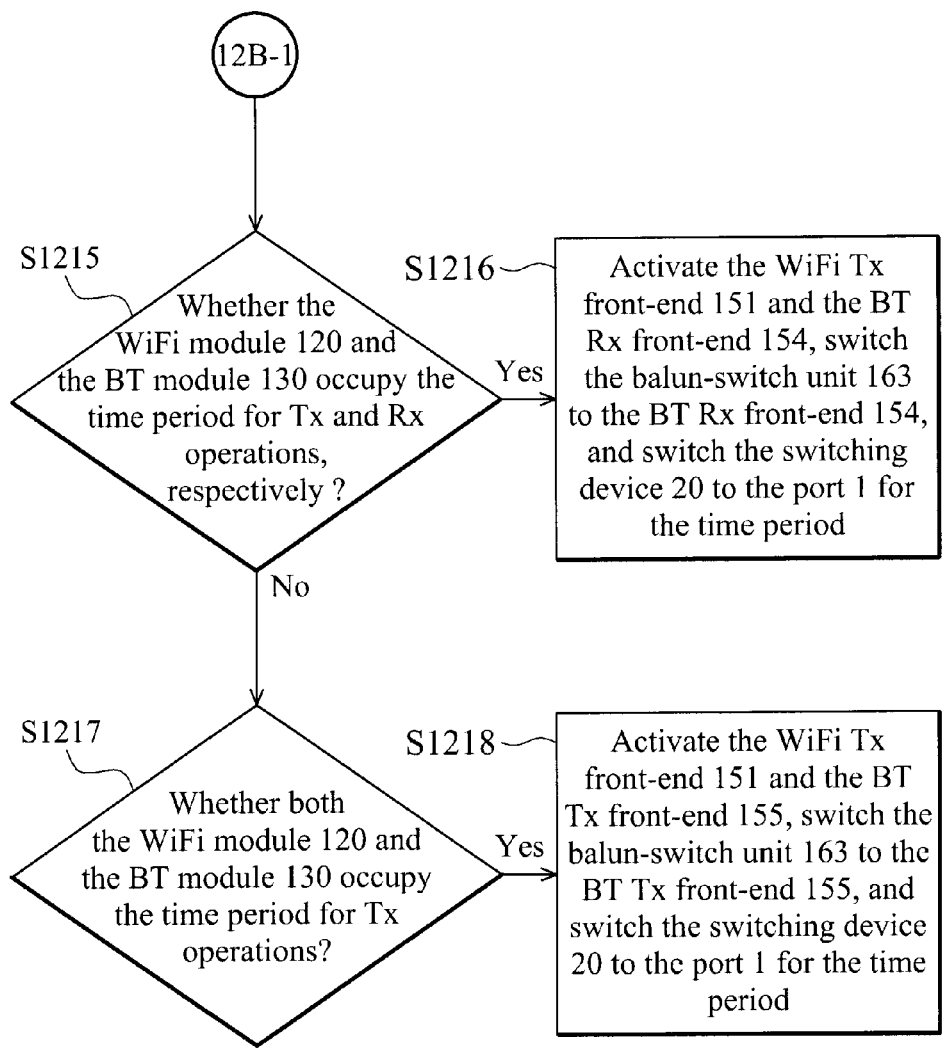
Figure 12G:
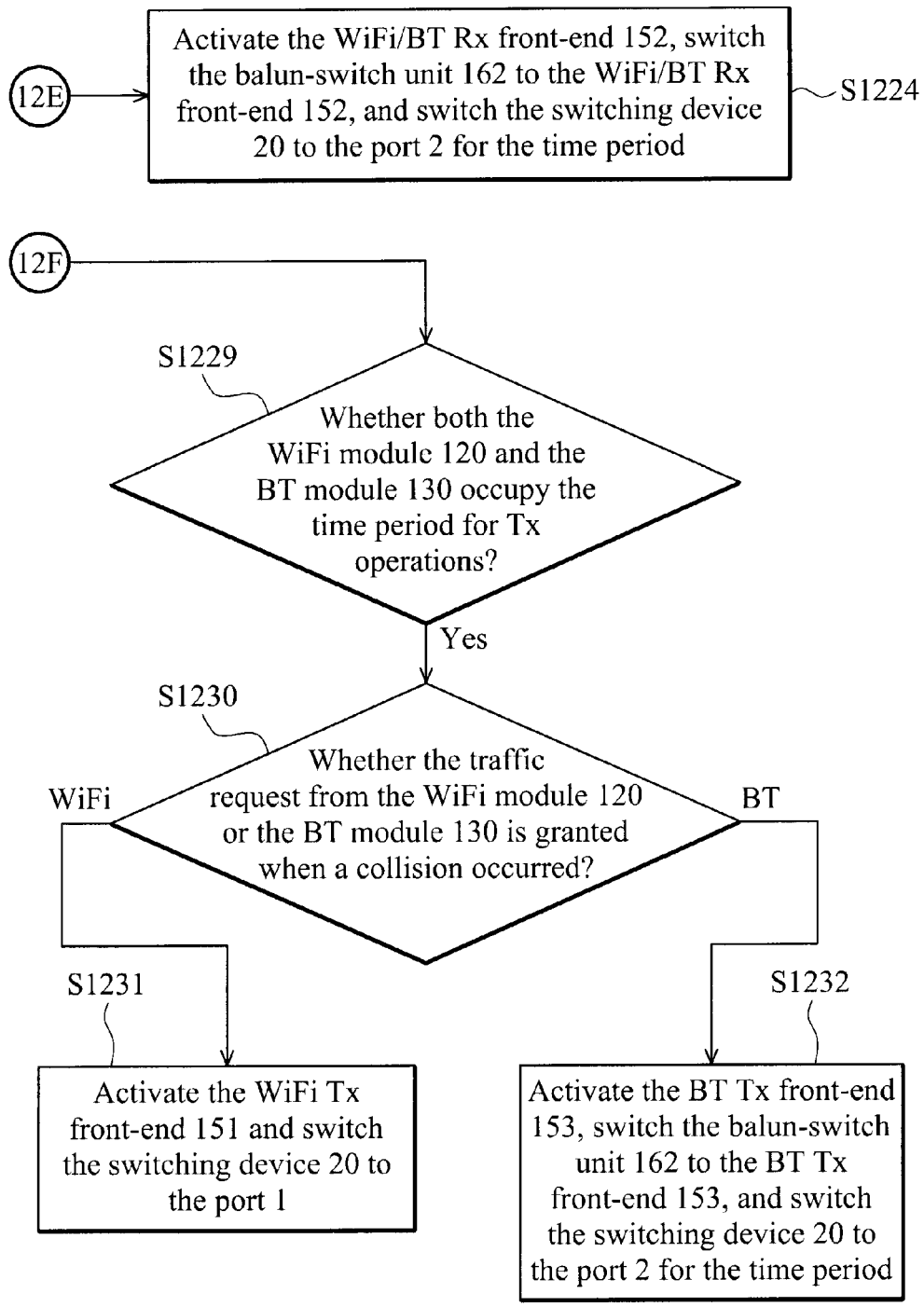

FIGS. 11A to 11C show a flowchart of the method for reducing interference between the WiFi module 120 and the BT module 130 in accordance with another embodiment of the invention. Similar to the steps S801 to S803 in FIG. 8, the method in this embodiment also begins with obtaining the in-band ranges for the BT Rx signals and the WiFi Rx signals by the WiFi module 120 and the BT module 130 (steps S1101~S1103). The method in this embodiment subsequently determines whether to apply power control according to the traffic parameters and the signal indicators of both the WiFi module 120 and BT module 130 (step S1104). If so, the process proceeds to step S1105. Otherwise, the process ends. In one embodiment, power control is applied when both of the RSSIs of the BT Rx signals and WiFi Rx signals are greater than a good-quality threshold value. That is, having the RSSIs greater than the good-quality threshold value means that the signal strength of the BT Rx signals and WiFi Rx signals is good enough to withstand some level of interference without jeopardizing the successful reception of the BT Rx signals and WiFi Rx signals. In another embodiment, power control may not be applied when the RSSI of the BT Rx signals or the WiFi Rx signals is lower than a fair-quality threshold value and the BT Rx signals or the WiFi Rx signals are for real-time applications. That is, having the RSSI of the BT Rx signals or the WiFi Rx signals lower than the fair-quality threshold value means that the signal strength of the BT Rx signals or the WiFi Rx signals is too weak to withstand any interference and even decreasing the transmission power of the transmitting module may still lead to an unsuccessful reception of the BT Rx signals or the WiFi Rx signals. Meanwhile, if the BT Rx signals or the WiFi Rx signals are for real-time applications, the data carried in the BT Rx signals or the WiFi Rx signals should be considered critical and the successful reception of the BT Rx signals or the WiFi Rx signals should be a first priority. Subsequent to S1104, if power control is to be applied, a series of inspections with respect to the operation statuses, the traffic parameters, and the signal indicators of the WiFi module 120 and BT module 130 are performed to determine whether in-band interference will be caused between the WiFi module 120 and BT module 130. Specifically, it is determined whether an Rx operation or a Tx operation is going to be performed by the BT module 130 in a forthcoming time period (step S1105). If the BT module 130 occupies the time period for an Rx operation, the BT module 130 determines whether in-band interference may be caused to the BT Rx signals by potential WiFi Tx signals in the time period according to the in-band range for the BT Rx signals and the traffic pattern of the BT Rx signals (step S1106). In one embodiment, the BT module 130 may determine whether there may be in-band interference by checking if any one of the next N hopped channels used by the BT Rx signals is in the in-band range for the BT Rx signals. That is, if one of the next N hopped channels used by the BT Rx signals is in the frequency band or near the frequency band of the WiFi Tx signals, then in-band interference may be caused to the BT Rx signals by potential WiFi Tx signals. After determining whether in-band interference may be caused, the BT module 130 sends the determination result and the signal indicators of the BT Rx signals to the WiFi module 120 (step S1107). In one embodiment, the BT module 130 may also send the traffic pattern information of the BT Rx signals to the WiFi module 120, including the starting time, duration, and repeating interval of the BT Rx signals. When the determination result is received, it is determined whether a Tx operation is going to be performed by the WiFi module 120 in the time period (step S1108). If so, the WiFi module 120 adjusts the transmission power of the WiFi Tx signals according to the determination result and the signal indicators of the BT Rx signals and the WiFi Tx signals. To be more specific, it is first determined whether the determination result indicates that in-band interference may be caused (step S1109). If the determination result indicates to the WiFi module 120 that the WiFi Tx signals may cause in-band interference to the BT Rx signals, the WiFi module 120 decreases the transmission power of the WiFi Tx signals according to the signal indicators of the BT Rx signals and the WiFi Tx signals, so that the BT Rx signals may be successfully received (step S1110). It is noted that the transmission power of the WiFi Tx signal is decreased in a way that the in-band interference to the BT Rx signals is reduced to satisfy the minimum requirement for the BT Rx signals to be successfully received by the BT module 130. Otherwise, if the determination result indicates to the WiFi module 120 that the WiFi Tx signals do not cause in-band interference to the BT Rx signals, the WiFi module 120 may use normal power to transmit the WiFi Tx signals (step S1111). Subsequent to step S1108, if not, the process goes back to wait for the next upcoming traffic requests from the WiFi module 120 and the BT module 130. The signal indicators of the BT Rx signals and the WiFi Tx signals may include RSSI, SNR, ACI, PER, or BER of the BT Rx signals and the WiFi Tx signals, respectively. In other embodiments, the transmission power of the WiFi Tx signals may also be adjusted according to the frequency offset between the frequencies or channels used by the BT Rx signals and the WiFi Tx signals, or the transceiving modulation types of the BT Rx signals and the WiFi Tx signals.

Subsequent to step S1105, if the BT module 130 occupies the time period for a Tx operation, the BT module 130 prepares and sends the traffic parameters of the BT Tx signals to the WiFi module 120 (step S1112). The traffic parameters of the BT Tx signals may include information concerning when the BT Tx signals will be transmitted, and what power level, modulation type, and channel will be used for transmitting the BT Tx signals. When the traffic parameters of the BT Tx signals are received from the BT module 130, it is determined whether an Rx operation is going to be performed by the WiFi module 120 in the time period (step S1113). If so, the BT module 130 determines whether the BT Tx signals may cause in-band interference to the WiFi Rx signals in the time period according to the in-band range for the WiFi Rx signals and the traffic parameters of the WiFi Rx signals (step S1114). If so, the BT module 130 decreases the transmission power of the BT Tx signals according to the signal indicators of the WiFi Rx signals and the BT Tx signals, so that the WiFi Rx signals may be successfully received (step S1115). Otherwise, if the BT Tx signals do not cause in-band ranges to the WiFi Rx signals, then normal transmission power of the BT Tx signals may be used (step S1116). Subsequent to step S1113, if not, the process goes back to wait for the next upcoming traffic requests from the WiFi module 120 and the BT module 130. The signal indicators of the BT Tx signals and the WiFi Rx signals may include RSSI, SNR, ACI, PER, or BER of the BT Tx signals and the WiFi Rx signals, respectively. In other embodiments, the transmission power of the BT Tx signals may also be adjusted according to the frequency offset between the frequencies or channels used by the WiFi Rx signals and the BT Tx signals, or the transceiving modulation types of the WiFi Rx signals and the BT Tx signals. It is noted that the transmission power of the WiFi Tx signals or the BT Tx signals in step S1109 or S1114 is decreased in a way that the in-band interference to the BT Rx signals or the WiFi Rx signals is reduced to satisfy the minimum requirement for the BT Rx signals or the WiFi Rx signals to be successfully received by the BT module 130 or the WiFi module 120, respectively.

For the components and connection configurations therebetween in the wireless communications chipset 100 described above, it is noted that the WiFi module 120 has one Tx front-end and one Rx front-end, while the BT modules 130 has two Tx front-ends and two Rx front-ends. After the transmission power control is performed as described above, the operation types of the system 400 with respect to the Tx front-ends and Rx front-end of the WiFi module 120 and the BT module 130 are determined Table 1 below depicts a combination of potential operation types performed by the system 400 according to an embodiment of the invention:

TABLE 1

| Mode | Operation Type | | | |
|---|---|---|---|---|
| | WiFi_Tx | WiFi_Rx | BT_Tx | BT_Rx |
| Mode 1 | 0 | 0 | 1 (Port 2) | 0 |
| Mode 2 | 0 | 0 | 0 | 1 (Port 2) |
| Mode 3 | 1 (Port 1) | 0 | 0 | 0 |
| Mode 4 | 0 | 1 (Port 2) | 0 | 0 |
| Mode 5 | 0 | 1 (Port 2) | 1 (Port 3) | 0 |
| Mode 6 | 0 | 1 (Port 2) | 0 | 1 (Port 3) |
| Mode 7 | 1 (Port 1) | 0 | 0 | 1 (Port 3) |
| Mode 8 | 1 (Port 1) | 0 | 1 (Port 3) | 0 |
| Mode 9 | 0 | 1 (Port 2) | 1 (Port 2) | 0 |
| Mode 10 | 0 | 1 (Port 2) | 0 | 1 (Port 2) |
| Mode 11 | 1 (Port 1) | 0 | 0 | 1 (Port 2) |
| Mode 12 | 1 (Port 1) | 0 | 1 (Port 2) | 0 |

In Table 1 above, "1" means TRUE, representing activation of a corresponding operation, whereas "0" means FALSE, representing deactivation of a corresponding operation. The operation modes in Table 1 above will be explained in more details with references to the flowchart in FIG. 12 below.

FIGS. 12A to 12G show a flowchart of the coexistence between WiFi and BT modules handled by the control unit 110 in accordance with an embodiment of the invention. The procedure begins with obtaining information regarding potential operation(s) that is/are going to be performed by the WiFi module 120 and BT module 130 in a forthcoming time period (step S1201). Next, a series of inspections with respect to the obtained information are accordingly performed to determine whether only one or both of the WiFi module 120 and BT module 130 occupy a time period, and whether the time period occupied for a Tx/Rx operation by one module collides with an Tx/Rx operation by the other module. Specifically, it is determined whether only the BT module 130 occupies the time period for a Tx operation (step S1202). If so, the control unit 110 sends control signals to activate the BT Tx front-end 153, switch the balun-switch unit 162 to the BT Tx front-end 153, and switch the switching device 20 to the port 2 for the time period (mode 1) (step S1203), thereby enabling the BT Tx signals to be transmitted from the BT module 130 via the BT Tx front-end 153, the port 2, and the through path between the ports 34 and 32 in sequence to the antenna 10. Subsequent to step S1202, if not, it is determined whether only the BT module 112 occupies the time period for an Rx operation (step S1204). If so, the control unit 110 sends control signals to activate the WiFi/BT Rx front-end 152, switch the balun-switch unit 162 to the WiFi/BT Rx front-end 152, and switch the switching device 20 to the port 2 for the time period (mode 2) (step S1205), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1104, if not, it is determined whether only the WiFi module 120 occupies the time period for a Tx operation (step S1206). If so, the control unit 110 sends control signals to activate the WiFi Tx front-end 151 and switch the switching device 20 to the port 1 for the time period (mode 3) (step S1207), thereby enabling the WiFi Tx signals to be transmitted from the WiFi module 120 via the WiFi Tx front-end 151, the port 1, and the through path between the ports 34 and 32 in sequence to the antenna 10. Subsequent to step S1206, if not, it is determined whether only the WiFi module 120 occupies the time period for an Rx operation (step S1208). If so, the control unit 110 sends control signals to activate the WiFi/BT Rx front-end 152, switch the balun-switch unit 162 to the WiFi/BT Rx front-end 152, and switch the switching device 20 to the port 2 for the time period (mode 4) (step S1209), thereby enabling the WiFi Rx signals to be received from the antenna 10 by the WiFi module 120 via the through path between the ports 32 and 34, the port 2, the WiFi/BT Rx front-end 152, and the separator 140 in sequence.

Subsequent to step S1208, if not, it means that both of the WiFi module 120 and the BT module 130 occupy the time period for their operations. However, it is noted that when a WiFi Rx/Tx operation and a BT Rx/Tx operation both take place at the same time, the WiFi Rx/Tx signals may interfere with the BT Rx/Tx signals, and vice versa. Consequently, the larger the wanted power of the WiFi Tx signals is, the greater the interferences are to the BT Rx/Tx signals, and vice versa. For this reason, it is determined whether transceiving statuses for the WiFi Rx/Tx signals and the BT Rx/Tx signals are in an operational range where coexistence is achievable (step S1210). The transceiving status may be wanted power, RSSI, historical PER, historical BER, SNR, or interference-to-signal ratio (ISR) of the WiFi Rx/Tx signals or the BT Rx/Tx signals. In addition, the transceiving status may be a certain number of reconnections for historical WiFi Rx/Tx operations or the BT Rx/Tx operations.

Note that for the cases in which the WiFi module 120 and the BT module 130 occupy the time period for Tx operation and Rx operation, respectively, or the WiFi module 120 and the BT module 130 occupy the time period for Rx operation and Tx operation, respectively, if the power control as described in FIG. 8 has been performed due to potential in-band interference between the WiFi module 120 and the BT module 130, then the adjusted power may ensure that the transceiving statuses for the WiFi Rx/Tx signals and the BT Rx/Tx signals are in an operational range where coexistence is achievable.

Subsequent to step S1210, if so, it is determined whether the WiFi module 120 and the BT module 130 occupy the time period for Rx and Tx operations, respectively (step S1211). If so, the control unit 110 sends control signals to activate the WiFi/BT Rx front-end 152 and the BT Tx front-end 155, switch the balun-switch units 162 and 163 to the WiFi/BT Rx front-end 152 and the BT Tx front-end 155, respectively, and switch the switching device 20 to the port 2 for the time period (mode 5) (step S1212), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Tx signals to be transmitted from the BT module 130 via the BT Tx front-end 155, the port 3, and the coupled path between the ports 32 and 36 in sequence to the antenna 10. Subsequent to step S1211, if not, it is determined whether both of the WiFi module 120 and the BT module 130 occupy the time period for Rx operations (step S1213). If so, the control unit 110 sends control signals to activate the WiFi/BT Rx front-end 152 and the BT Rx front-end 154, switch the balun-switch units 162 and 163 to the WiFi/BT Rx front-end 152 and the BT Rx front-end 154, respectively, and switch the switching device 20 to the port 2 for the time period (mode 6) (step S1214), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Rx signals to be received from the antenna 10 by the BT module 130 via the coupled path between the ports 32 and 36, the port 3, and the BT Rx front-end 154 in sequence. Subsequent to step S1213, if not, it is determined whether the WiFi module 120 and the BT module 130 occupy the time period for Tx and Rx operations, respectively (step S1215). If so, the control unit 110 sends control signals to activate the WiFi Tx front-end 151 and the BT Rx front-end 154, switch the balun-switch unit 163 to the BT Rx front-end 154, and switch the switching device 20 to the port 1 for the time period (mode 7) (step S1216), thereby enabling the WiFi Tx signals to be transmitted from the WiFi module 120 via the WiFi Tx front-end 151, the balun unit 161, the port 1, and the through path between the ports 32 and 34 in sequence to the antenna 10, along with the BT Rx signals to be received from the antenna 10 by the BT module 130 via the coupled path between the ports 32 and 36, the port 3, and the BT Rx front-end 154 in sequence. Subsequent to step S1215, if not, it is determined whether both of the WiFi module 120 and the BT module 130 occupy the time period for Tx operations (step S1217). If so, the control unit 110 sends control signals to activate the WiFi Tx front-end 151 and the BT Tx front-end 155, switch the balun-switch unit 163 to the BT Tx front-end 155, and switch the switching device 20 to the port 1 for the time period (mode 8) (step S1218), thereby enabling the WiFi Tx signals to be transmitted from the WiFi module 120 via the WiFi Tx front-end 151, the balun unit 161, the port 1, and the through path between the ports 32 and 34 in sequence to the antenna 10, along with the BT Tx signals to be transmitted from the BT module 130 via the BT Tx front-end 155, the port 3, and the coupled path between the ports 32 and 36 in sequence to the antenna 10.

Subsequent to step S1210, if not, it is determined whether the WiFi module 120 and the BT module 130 occupy the time period for Rx and Tx operations, respectively (step S1219). If so, the control unit 110 determines whether a collision has occurred in the traffic requests from the WiFi module 120 and the BT module 130, and arbitrates which traffic request is to be granted when a collision has occurred (step S1220). If the granted traffic request is from the WiFi module 120, the control unit 110 sends control signals to activate the WiFi/BT Rx front-end 152, switch the balun-switch unit 162 to the WiFi/BT Rx front-end 152, and switch the switching device 20 to the port 2 for the time period (mode 9) (step S1221), thereby enabling the WiFi Rx signals to be received from the antenna 10 by the WiFi module 120 via the through path between the ports 32 and 34, the port 2, the WiFi/BT Rx front-end 152, and the separator 140 in sequence. If the granted traffic request is from the BT module 130, the control unit 110 sends control signals to activate the BT Tx front-end 153, switch the balun-switch unit 162 to the BT Tx front-end 153, and switch the switching device 20 to the port 2 for the time period (mode 9) (step S1222), thereby enabling the BT Tx signals to be transmitted from the BT module 130 via the BT Tx front-end 153, the balun-switch unit 162, the port 2, and the through path between the ports 32 and 34 in sequence to the antenna 10. Subsequent to step S1219, if not, it is determined whether both of the WiFi module 120 and the BT module 130 occupy the time period for Rx operations (step S1223). If so, the control unit sends control signals to activate the WiFi/BT Rx front-end 152, switch the balun-switch unit 162 to the WiFi/BT Rx front-end 152, and switch the switching device 20 to the port 2 for the time period (mode 10) (step S1224), thereby enabling a combined signal to be received from the antenna 10 by the separator 140 via the through path between ports 32 and 34, the port 2, and the WiFi/BT Rx front-end 152 in sequence. Thereafter, the separator 140 separates them into the WiFi and BT Rx signals and further forwarded to the WiFi module 120 and BT module 130, respectively. Subsequent to step S1223, if not, it is determined whether the WiFi module 120 and the BT module 130 occupy the time period for Tx and Rx operations, respectively (step S1225). If so, the control unit 110 determines whether a collision has occurred in the traffic requests from the WiFi module 120 and the BT module 130, and arbitrates which traffic request is to be granted when a collision has occurred (step S1226). If the granted traffic request is from the WiFi module 120, the control unit 110 sends control signals to activate the WiFi Tx front-end 151 and switch the switching device 20 to the port 1 for the time period (mode 11) (step S1227), thereby enabling the WiFi Tx signals to be transmitted from the WiFi module 120 via the WiFi Tx front-end 151, the balun unit 161, the port 1, and the through path between the ports 32 and 34 in sequence to the antenna 10. If the granted traffic request is from the BT module 130, the control unit 110 sends control signals to activate the WiFi/BT Rx front-end 152, switch the balun-switch unit 162 to the WiFi/BT Rx front-end 152, and switch the switching device 20 to the port 2 for the time period (mode 11) (step S1228), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1225, if not, it is determined whether both of the WiFi module 120 and the BT module 130 occupy the time period for Tx operations (step S1229). If so, the control unit 110 determines whether a collision has occurred in the traffic requests from the WiFi module 120 and the BT module 130, and arbitrates which traffic request is to be granted when a collision has occurred (step S1230). If the granted traffic request is from the WiFi module 120, the control unit 110 sends control signals to activate the WiFi Tx front-end 151 and switch the switching device 20 to the port 1 (mode 12) (step S1231), thereby enabling the WiFi Tx signals to be transmitted from the WiFi module 120 via the WiFi Tx front-end 151, the balun unit 161, the port 1, and the through path between the ports 32 and 34 in sequence to the antenna 10. If the granted traffic request is from the BT module 130, the control unit 110 sends control signals to activate the BT Tx front-end 153, switch the balun-switch unit 162 to the BT Tx front-end 153, and switch the switching device 20 to the port 2 for the time period (mode 12) (step S1232), thereby enabling the BT Tx signals to be transmitted from the BT module 130 via the BT Tx front-end 153, the port 2, and the through path between the ports 32 and 34 in sequence to the antenna 10.

Those skilled in the art may readily modify the hardware structure of the system 400 by implementing the connection device 30 in a 3-port power splitter having an input port 32 and two output ports 34 and 36. The first path between the input port 32 and the output port 34 has a first path loss, and the second path between the input port 32 and the output port 36 has a second path loss. For a power splitter with equal loss, the path loss of the first and second paths is the same, while it is different for an unequal-loss power splitter. For the coupling values for the power splitter, reference may be made to Table 2 below:

TABLE 2

| Coupling Value For Through Path | Power Ratio (%) |
|---|---|
| 3 dB | 50/50 |
| 6 dB | 75/25 |
| 8 dB | 85/15 |
| 10 dB | 90/10 |
| 15 dB | 97/3 |
| 20 dB | 99/1 |

Taking the coupling value of 3 dB (3 dB directional coupler) for example, the through path has a path loss of 3 dB substantially, whereas the coupled path also has a path loss of 3 dB substantially. For the 6 dB directional coupler, the through path has a path loss of 1 dB substantially, whereas the coupled path also has a path loss of 6 dB substantially. For the 10 dB directional coupler, the through path has a path loss of 0.5 dB substantially, whereas the coupled path also has a path loss of 10 dB substantially.

Figure 13:
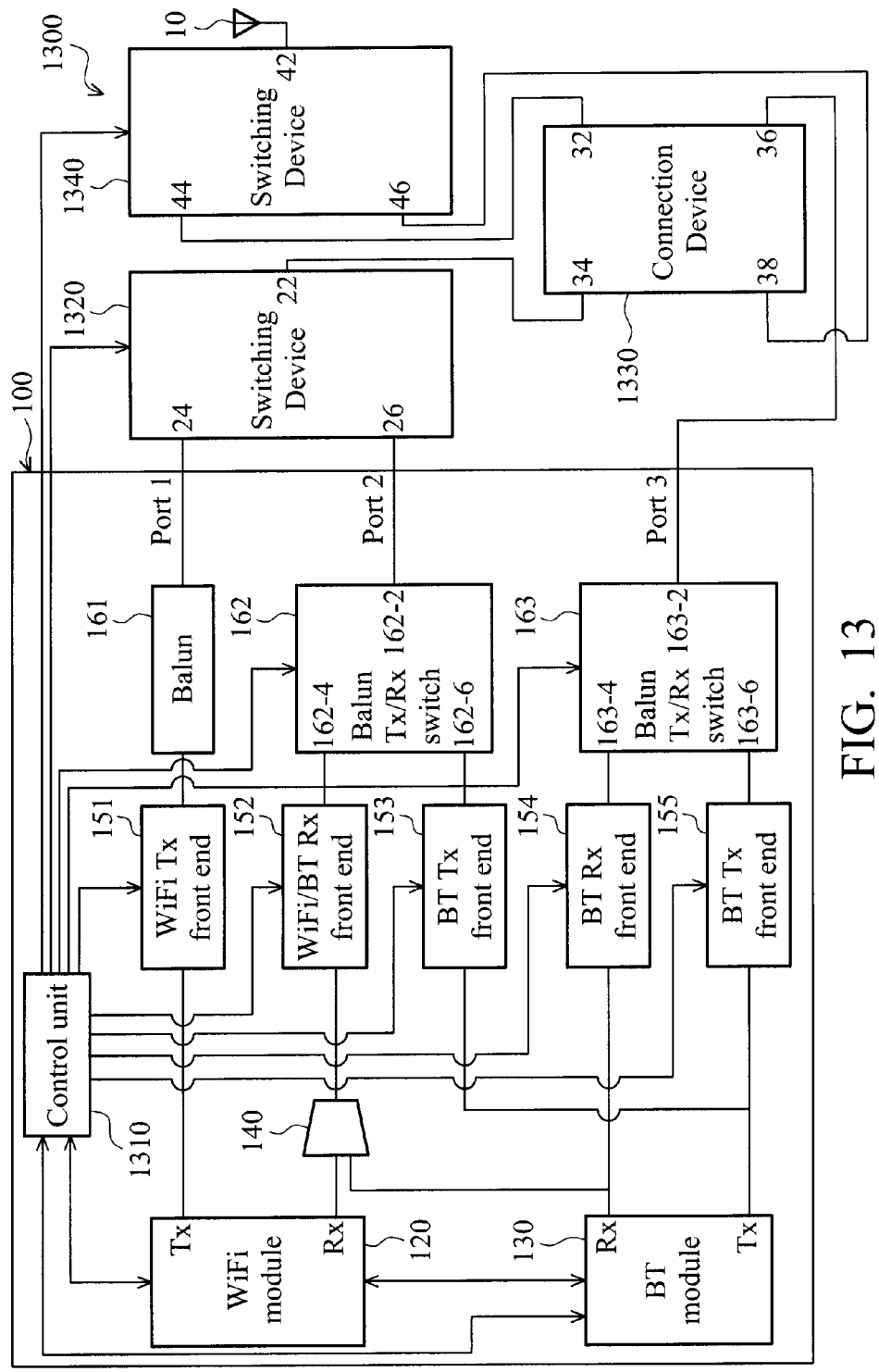
FIG. 13 shows a diagram illustrating a system for the coexistence between two wireless communications modules sharing a single antenna according to another embodiment of the invention.
Figure 14A:
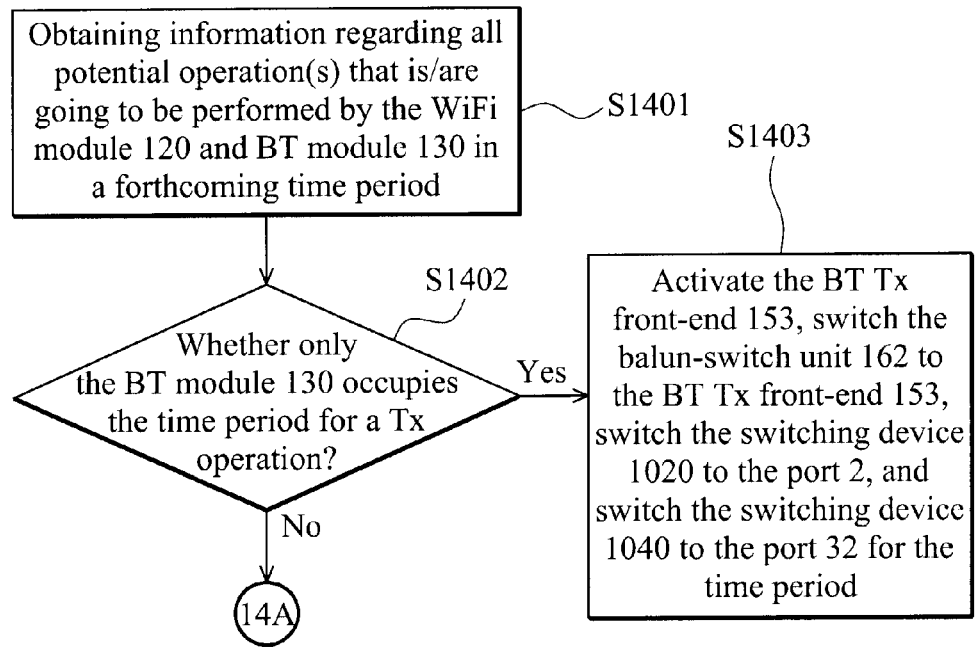
FIGS. 14A to 14G show a flowchart for handling coexistence between WiFi and BT modules according to an embodiment of the invention, based on the system of FIG. 13.
Figure 14A:
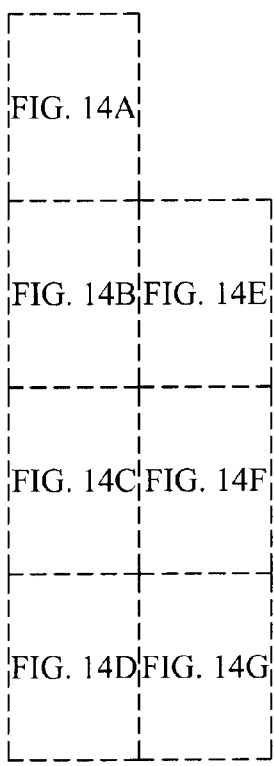
Figure 14B:
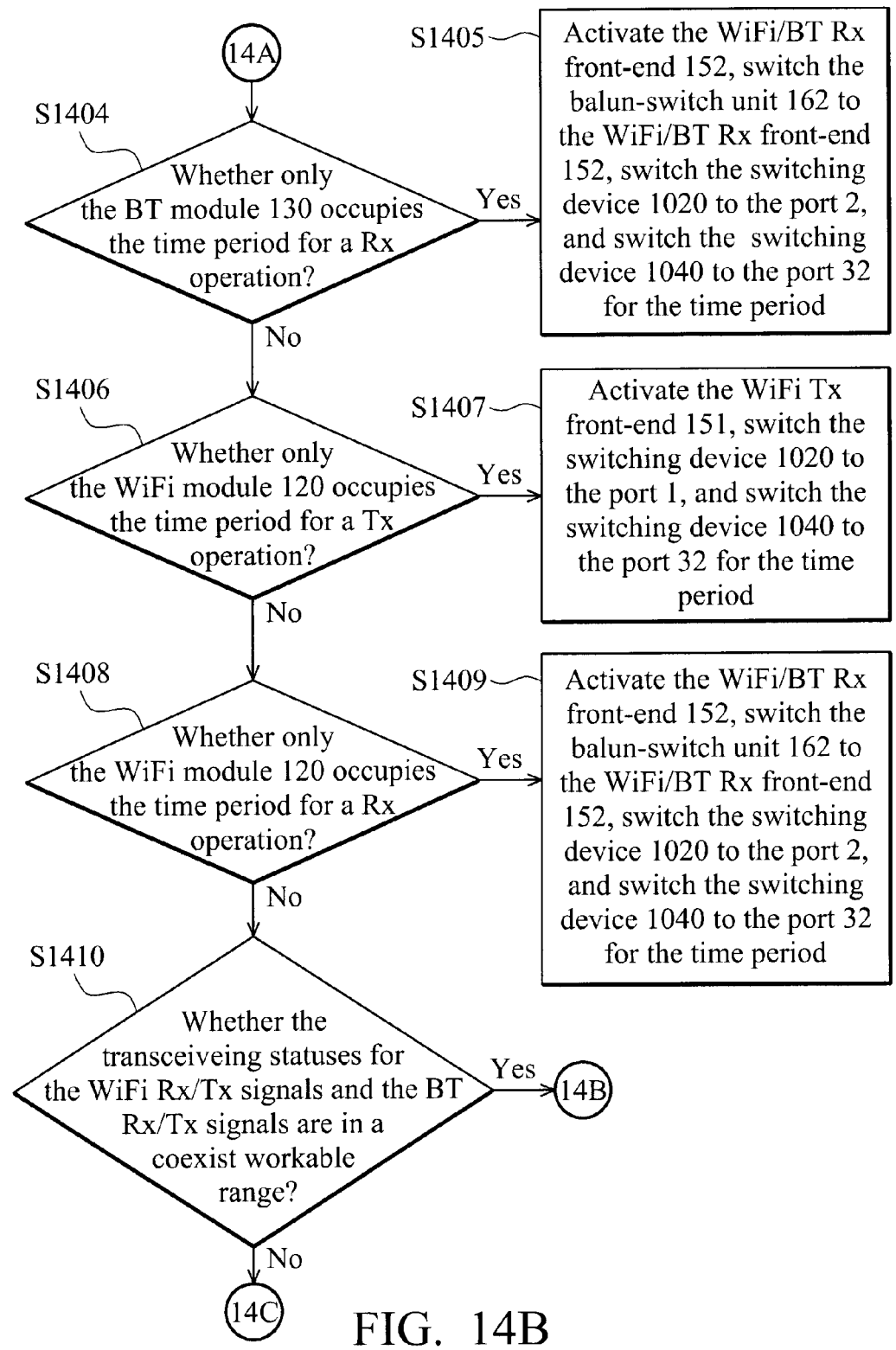
Figure 14C:
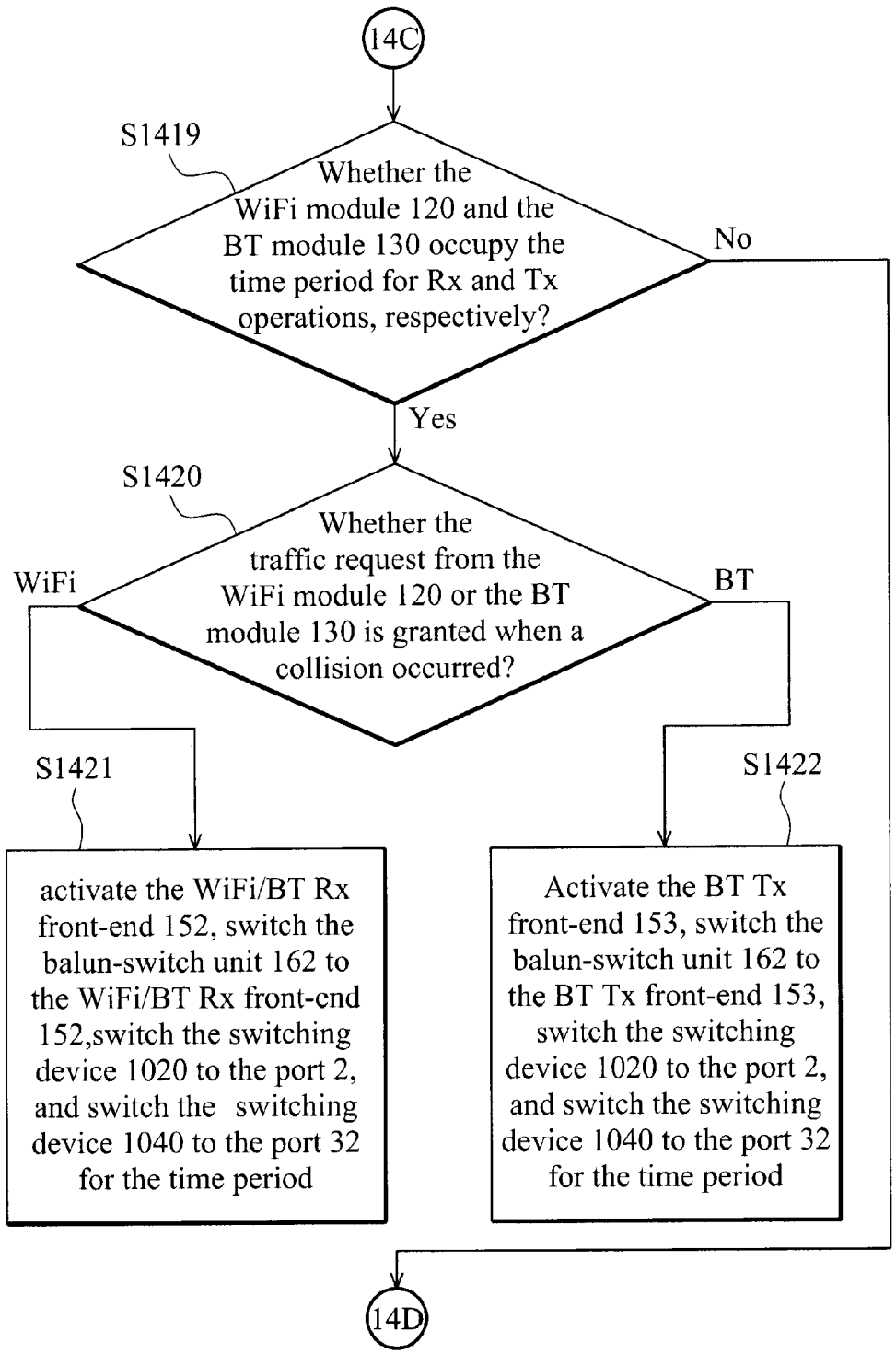
Figure 14D:
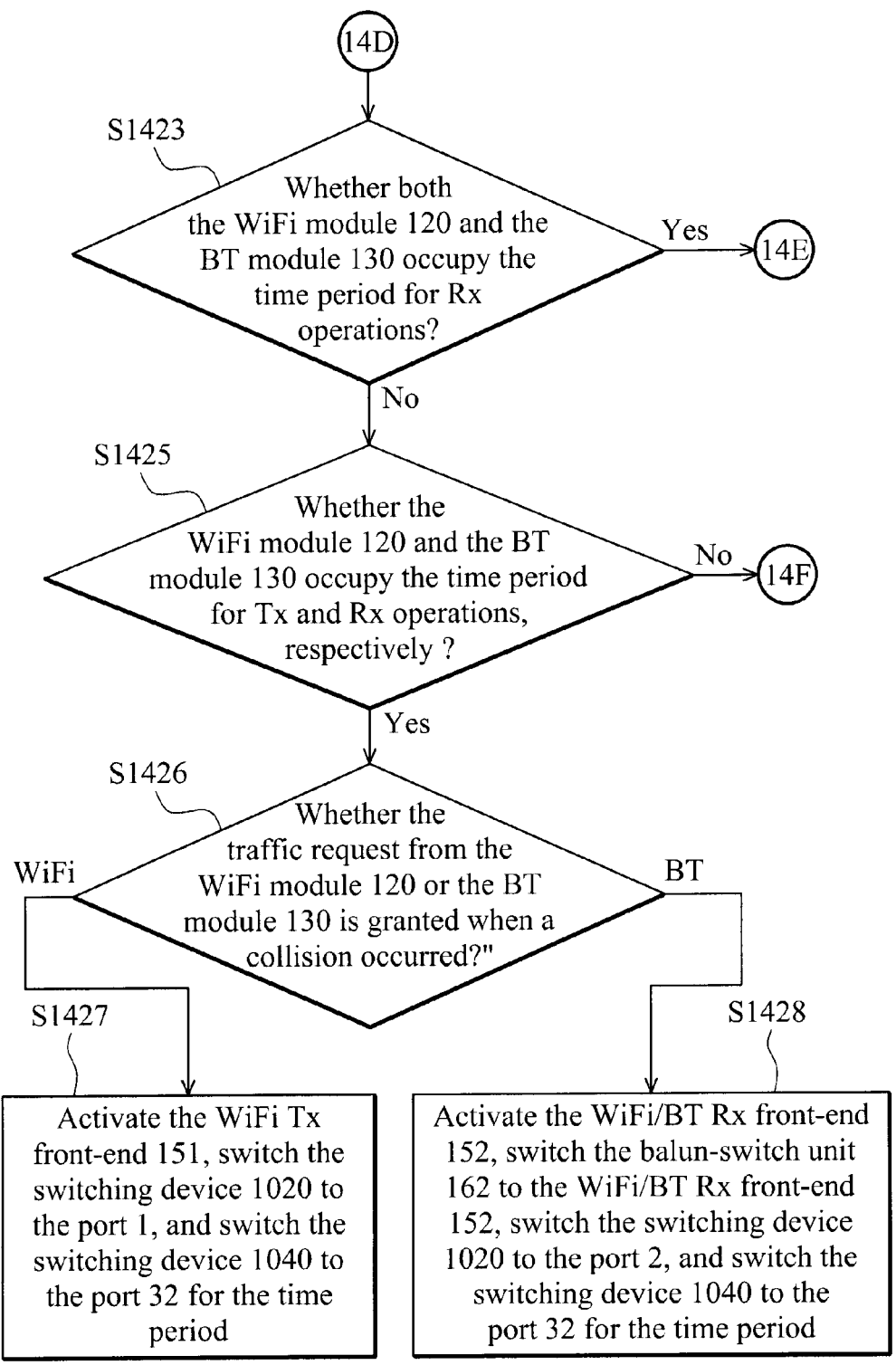
Figure 14E:
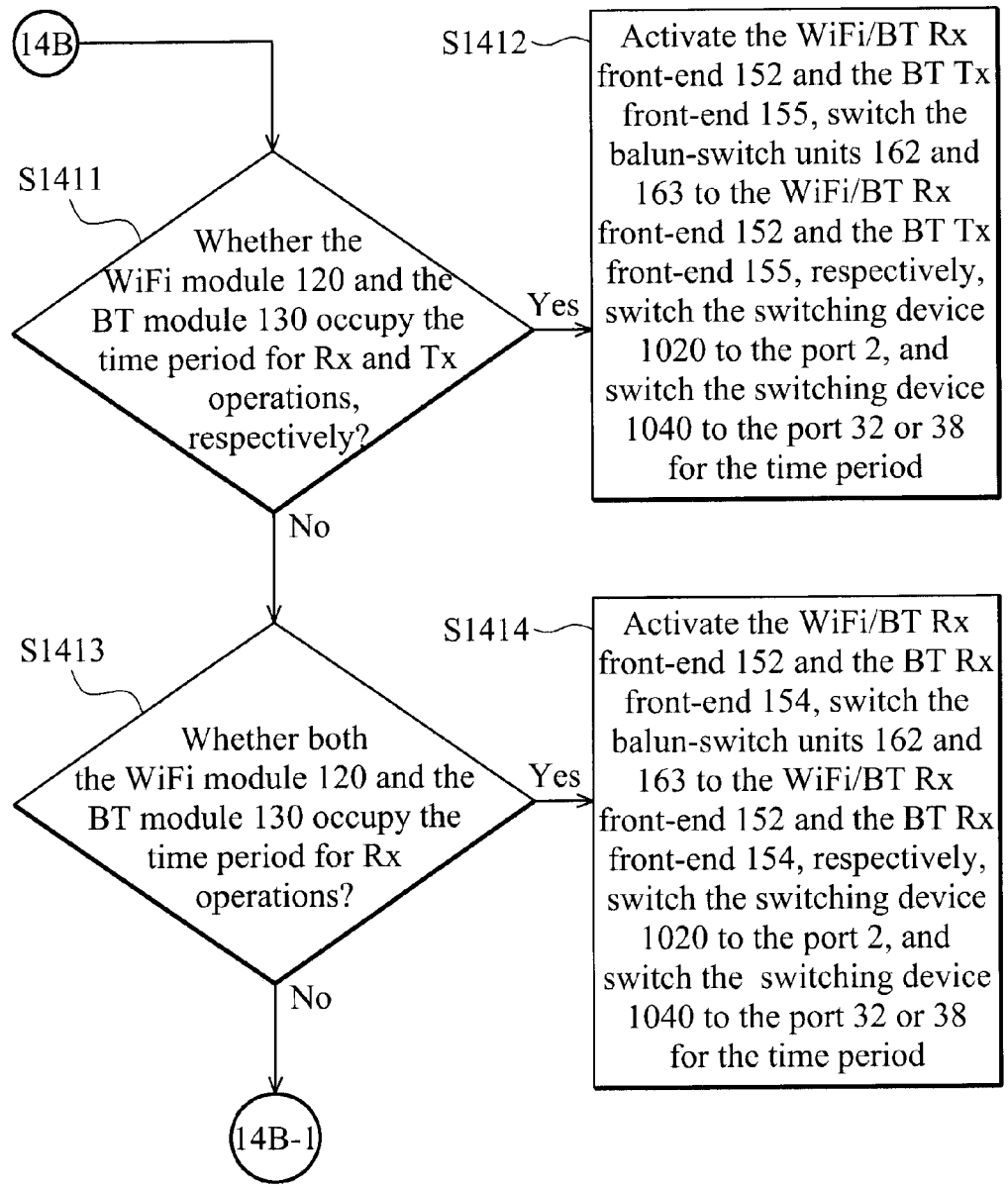
Figure 14F:
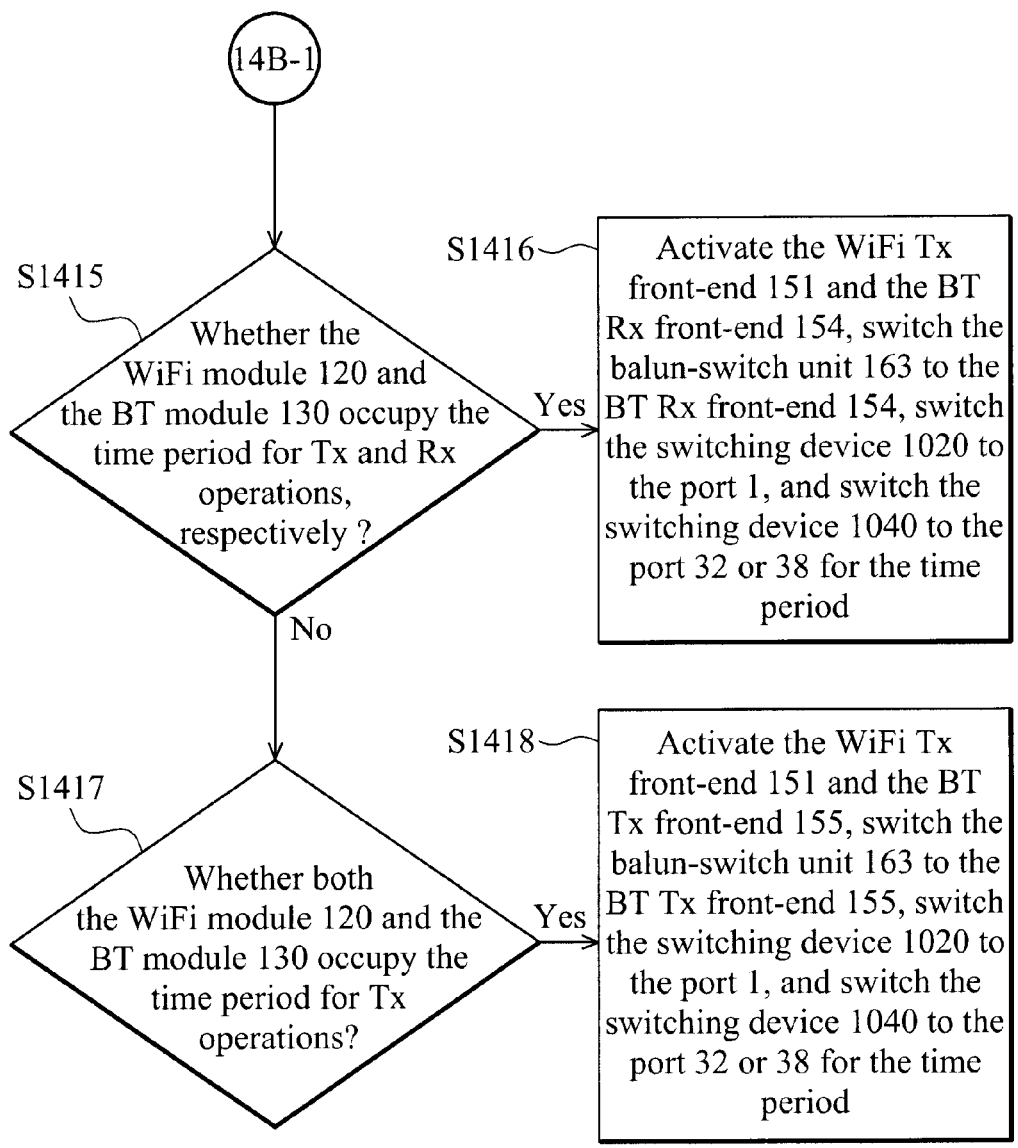
Figure 14G:
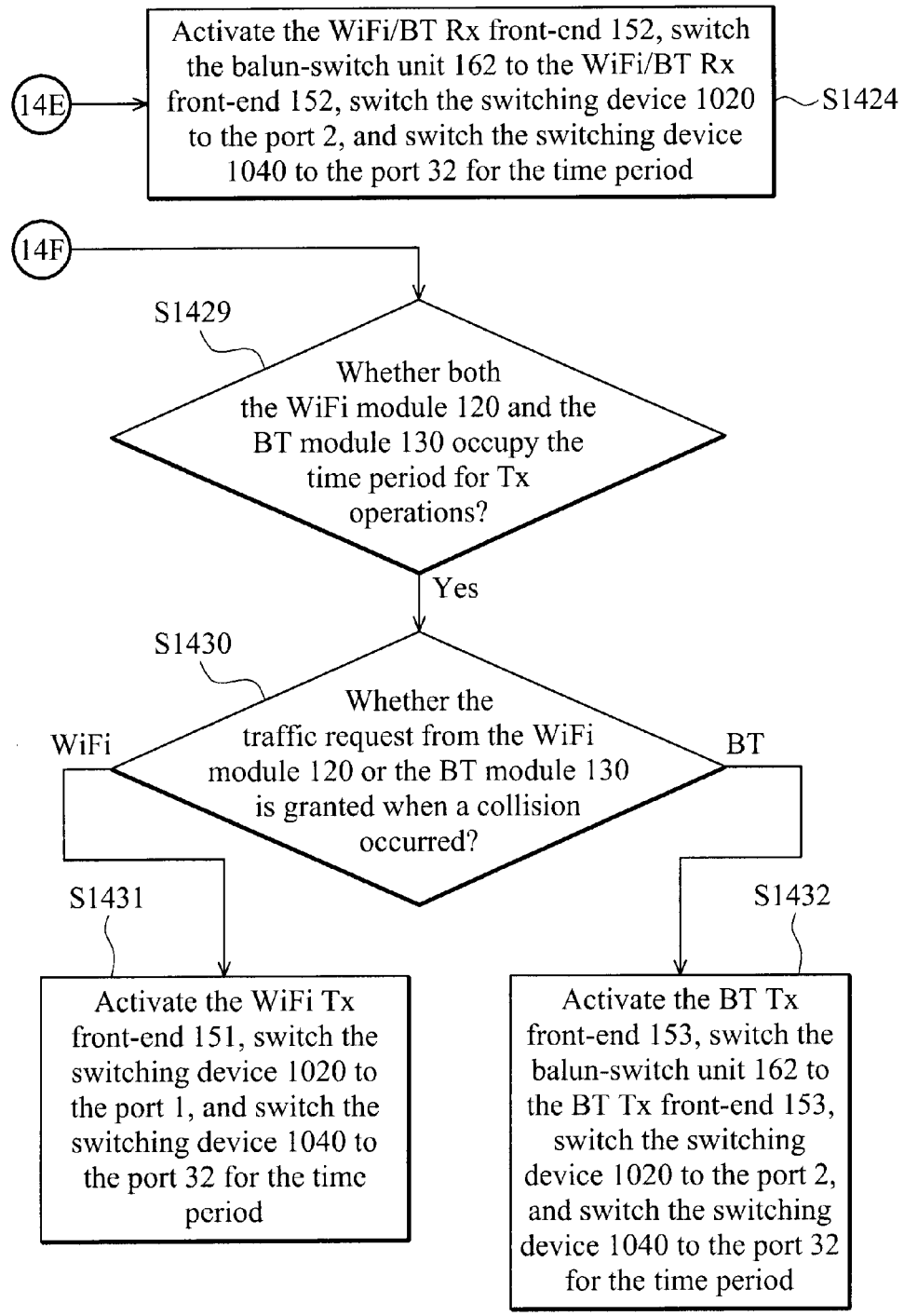

In another embodiment of the invention, an additional switch device may be included in the system 400, as shown in FIG. 13. Similar to the system 400 in FIG. 4, the system 1300 herein also comprises the antenna 10 and the wireless communications chipset 100. Regarding descriptions of the antenna 10 and the elements in the wireless communications chipset 100 excluding the control unit 110, reference may be made to FIG. 4. However, the elements between the antenna 10 and the wireless communications chipset 100 in the system 1300 are different from those in the system 400. A switching device 1320, similar to the switching device 20, is configured to selectively connect the terminal 22 to the terminal 24 and 26 as controlled by the control unit 1310, wherein the terminal 24 is connected to the port 1, the terminal 26 is connected to the port 2, and the terminal 22 is connected to the port 34 of a connection device 1330. The switching device 1320 may be implemented by an SPDT switch. The connection device 1330 is similar to the connection device 30, in which the ports 32 and 34 are connected via a first through path, the ports 36 and 38 are connected via a second through path, the ports 32 and 36 are coupled via a first coupled path, the ports 34 and 38 are coupled via a second coupled path, the ports 34 and 36 are isolated, and the ports 32 and 38 are isolated, wherein the first and second through paths are direct or indirect through. In addition, the ports 32 and 38 are connected to the terminals 44 and 46 of a switching device 1340, respectively, and the port 36 is connected to the port 3. The switching device 1340 is similar to the switching device 1320, which consists of three terminals 42, 44, and 46, and is configured to selectively connect the terminal 42 to the terminal 44 and 46 as controlled by the control unit 1310, wherein the terminal 42 is connected to the antenna 10. The switching devices 1320 and 1340, and the connection device 1330 may be integrated as a path selection circuit and disposed on a PCB. Note the first and second through paths may have a loss of 0.5 dB substantially, whereas the first and second coupled paths may have a loss of 10 dB substantially, or the first and second through paths may have a loss of 1 dB substantially, whereas the first and second coupled paths may have a loss of 6 dB substantially.

In the following discussion, reference may be made to Table 1 and related descriptions. In response to the modification of the path selection circuit, the control unit 1310 performs similar but different function than that of FIG. 4. FIGS. 14A to 14G show a flowchart of the coexistence between WiFi and BT modules handled by the control unit 1310 in accordance with an embodiment of the invention. The procedure begins with obtaining information regarding potential operation(s) that is/are going to be performed by the WiFi module 120 and BT module 130 in a forthcoming time period (step S1401). Next, a series of inspections with respect to the obtained information are accordingly performed to determine whether only one or both of the WiFi module 120 and BT module 130 occupy the time period, and whether the time period is occupied for a Tx/Rx operation by one module collides with an Tx/Rx operation by the other module. Specifically, it is determined whether only the BT module 130 occupies the time period for a Tx operation (step S1402). If so, the control unit 1310 sends control signals to activate the BT Tx front-end 153, switch the balun-switch unit 162 to the BT Tx front-end 153, switch the switching device 1320 to the port 2, and switch the switching device 1340 to the port 32 for the time period (mode 1) (step S1403), thereby enabling the BT Tx signals to be transmitted from the BT module 130 via the BT Tx front-end 153, the port 2, and the through path between the ports 34 and 32 in sequence to the antenna 10. Subsequent to step S1402, if not, it is determined whether only the BT module 130 occupies the time period for an Rx operation (step S1404). If so, the control unit 1310 sends control signals to activate the WiFi/BT Rx front-end 152, switch the balun-switch unit 162 to the WiFi/BT Rx front-end 152, switch the switching device 1320 to the port 2, and switch the switching device 1340 to the port 32 for the time period (mode 2) (step S1405), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1404, if not, it is determined whether only the WiFi module 120 occupies the time period for a Tx operation (step S1406). If so, the control unit 1310 sends control signals to activate the WiFi Tx front-end 151, switch the switching device 1320 to the port 1, and switch the switching device 1340 to the port 32 for the time period (mode 3) (step S1407), thereby enabling the WiFi Tx signals to be transmitted from the WiFi module 120 via the WiFi Tx front-end 151, the port 1, and the through path between the ports 34 and 32 in sequence to the antenna 10. Subsequent to step S1406, if not, it is determined whether only the WiFi module 120 occupies the time period for an Rx operation (step S1408). If so, the control unit 1310 sends control signals to activate the WiFi/BT Rx front-end 152, switch the balun-switch unit 162 to the WiFi/BT Rx front-end 152, switch the switching device 1320 to the port 2, and switch the switching device 1340 to the port 32 for the time period (mode 4) (step S1409), thereby enabling the WiFi Rx signals to be received from the antenna 10 by the WiFi module 120 via the through path between the ports 32 and 34, the port 2, the WiFi/BT Rx front-end 152, and the separator 140 in sequence.

Subsequent to step S1408, if not, it means that both of the WiFi module 120 and the BT module 130 occupy the time period for their operations. Since the WiFi Rx/Tx signals may interfere with the BT Rx/Tx signals, and vice versa, it is determined whether the transceiving statuses for the WiFi Rx/Tx signals and the BT Rx/Tx signals are in an operational range where coexistence is achievable (step S1410). The transceiving status may be the wanted power, RSSI, historical PER, historical BER, SNR, or ISR of the WiFi Rx/Tx signals or the BT Rx/Tx signals. In addition, the transceiving status may be a certain number of reconnections for historical WiFi Rx/Tx operations or the BT Rx/Tx operations. Subsequent to step S1410, if so, it is determined whether the WiFi module 120 and the BT module 130 occupy the time period for Rx and Tx operations, respectively (step S1411). If so, the control unit 1310 sends control signals to activate the WiFi/BT Rx front-end 152 and the BT Tx front-end 155, switch the balun-switch units 162 and 163 to the WiFi/BT Rx front-end 152 and the BT Tx front-end 155, respectively, switch the switching device 1320 to the port 2, and switch the switching device 1340 to the port 32 or 38 for the time period (mode 5) (step S1412), thereby enabling the WiFi Rx signals to be received from the antenna 10 by the WiFi module via the through path between the ports 32 and 34, the port 2, the WiFi/BT Rx front-end 152, and the separator 140 in sequence, along with the BT Tx signals to be transmitted from the BT module 130 via the BT Tx front-end 155, the port 3, and the through path between the ports 36 and 38 in sequence to the antenna 10. Subsequent to step S1411, if not, it is determined whether both of the WiFi module 120 and the BT module 130 occupy the time period for Rx operations (step S1413). If so, the control unit 1310 sends control signals to activate the WiFi/BT Rx front-end 152 and the BT Rx front-end 154, switch the balun-switch units 162 and 163 to the WiFi/BT Rx front-end 152 and the BT Rx front-end 154, respectively, switch the switching device 1320 to the port 2, and switch the switching device 1340 to the port 32 or 38 for the time period (mode 6) (step S1414), thereby enabling the WiFi Rx signals to be received from the antenna 10 by the WiFi module 120 via the through path between the ports 32 and 34, the port 2, the WiFi/BT Rx front-end 152, and the separator 140 in sequence, along with the BT Rx signals to be received from the antenna 10 by the BT module 130 via the through path between the ports 36 and 38, the port 3, and the BT Rx front-end 154 in sequence. Subsequent to step S1413, if not, it is determined whether the WiFi module 120 and the BT module 130 occupy the time period for Tx and Rx operations, respectively (step S1415). If so, the control unit 1310 sends control signals to activate the WiFi Tx front-end 151 and the BT Rx front-end 154, switch the balun-switch unit 163 to the BT Rx front-end 154, switch the switching device 1320 to the port 1, and switch the switching device 1340 to the port 32 or 38 for the time period (mode 7) (step S1416), thereby enabling the WiFi Tx signals to be transmitted from the WiFi module 120 via the WiFi Tx front-end 151, the port 1, and the through path between the ports 32 and 34 in sequence to the antenna 10, along with the BT Rx signals to be received from the antenna 10 by the BT module 130 via the through path between the ports 36 and 38, the port 3, and the BT Rx front-end 154 in sequence. Subsequent to step S1415, if not, it is determined whether both of the WiFi module 120 and the BT module 130 occupy the time period for Tx operations (step S1417). If so, the control unit 1310 sends control signals to activate the WiFi Tx front-end 151 and the BT Tx front-end 155, switch the balun-switch unit 163 to the BT Tx front-end 155, switch the switching device 1320 to the port 1, and switch the switching device 1340 to the port 32 or 38 for the time period (mode 8) (step S1418), thereby enabling the WiFi Tx signals to be transmitted from the WiFi module 120 via the WiFi Tx front-end 151, balun 161, the port 1, and the through path between the ports 32 and 34 in sequence to the antenna 10, along with the BT Tx signals to be transmitted from the BT module 130 via the BT Tx front-end 155, the port 3, and the through path between the ports 36 and 38 in sequence to the antenna 10.

Subsequent to step S1410, if not, it is determined whether the WiFi module 120 and the BT module 130 occupy the time period for Rx and Tx operations, respectively (step S1419). If so, the control unit 1310 determines whether a collision has occurred in the traffic requests from the WiFi module 120 and the BT module 130, and arbitrates which traffic request is to be granted when a collision has occurred (step S1420). If the granted traffic request is from the WiFi module 120, the control unit 1310 sends control signals to activate the WiFi/BT Rx front-end 152, switch the balun-switch unit 162 to the WiFi/BT Rx front-end 152, switch the switching device 1320 to the port 2, and switch the switching device 1340 to the port 32 for the time period (mode 9) (step S1421), thereby enabling the WiFi Rx signals to be received from the antenna 10 by the WiFi module 120 via the through path between the ports 32 and 34, the port 2, the WiFi/BT Rx front-end 152, and the separator 140 in sequence. If the granted traffic request is from the BT module 130, the control unit 1310 sends control signals to activate the BT Tx front-end 153, switch the balun-switch unit 162 to the BT Tx front-end 153, switch the switching device 1320 to the port 2, and switch the switching device 1340 to the port 32 for the time period (mode 9) (step S1422), thereby enabling the BT Tx signals to be transmitted from the BT module 130 via the BT Tx front-end 153, the port 2, and the through path between the ports 32 and 34 in sequence to the antenna 10. Subsequent to step S1419, if not, it is determined whether both of the WiFi module 120 and the BT module 130 occupy the time period for Rx operations (step S1423). If so, the control unit 1310 sends control signals to activate the WiFi/BT Rx front-end 152, switch the balun-switch unit 162 to the WiFi/BT Rx front-end 152, switch the switching device 1320 to the port 2, and switch the switching device 1340 to the port 32 for the time period (mode 10) (step S1424), thereby enabling a combined signal to be received from the antenna 10 by the separator 140 via the through path between ports 32 and 34, the port 2, and the WiFi/BT Rx front-end 152 in sequence. Thereafter, the separator 140 separates them into the WiFi and BT Rx signals and further forwarded to the WiFi module 120 and BT module 130, respectively. Subsequent to step S1423, if not, it is determined whether the WiFi module 120 and the BT module 130 occupy the time period for Tx and Rx operations, respectively (step S1425). If so, the control unit 1310 determines whether a collision has occurred in the traffic requests from the WiFi module 120 and the BT module 130, and arbitrates which traffic request is to be granted when a collision has occurred (step S1426). If the granted traffic request is from the WiFi module 120, the control unit 1310 sends control signals to activate the WiFi Tx front-end 151, switch the switching device 1320 to the port 1, and switch the switching device 1340 to the port 32 for the time period (mode 11) (step S1427), thereby enabling the WiFi Tx signals to be transmitted from the WiFi module 120 via the WiFi Tx front-end 151, balun 161, the port 1, and the through path between the ports 32 and 34 in sequence to the antenna 10. If the granted traffic request is from the BT module 130, the control unit 1310 sends control signals to activate the WiFi/BT Rx front-end 152, switch the balun-switch unit 162 to the WiFi/BT Rx front-end 152, switch the switching device 1320 to the port 2, and switch the switching device 1340 to the port 32 for the time period (mode 11) (step S1428), thereby enabling the BT Rx signals to be received from the antenna 10 by the BT module 130 via the through path between the ports 32 and 34, the port 2, the WiFi/BT Rx front-end 152, and the separator 140 in sequence. Subsequent to step S1425, if not, it is determined whether both of the WiFi module 120 and the BT module 130 occupy the time period for Tx operations (step S1429). If so, the control unit 1310 determines whether a collision has occurred in the traffic requests from the WiFi module 120 and the BT module 130, and arbitrates which traffic request is to be granted when a collision has occurred (step S1430). If the granted traffic request is from the WiFi module 120, the control unit 1310 sends control signals to activate the WiFi Tx front-end 151, switch the switching device 1320 to the port 1, and switch the switching device 1340 to the port 32 for the time period (mode 12) (step S1431), thereby enabling the WiFi Tx signals to be transmitted from the WiFi module 120 via the WiFi Tx front-end 151, balun 161, the port 1, and the through path between the ports 32 and 34 in sequence to the antenna 10. If the granted traffic request is from the BT module 130, the control unit 1310 sends control signals to activate the BT Tx front-end 153, switch the balun-switch unit 162 to the BT Tx front-end 153, switch the switching device 1320 to the port 2, and switch the switching device 1340 to the port 32 for the time period (mode 12) (step S1432), thereby enabling the BT Tx signals to be transmitted from the BT module 130 via the BT Tx front-end 153, the port 2, and the through path between the ports 32 and 34 in sequence to the antenna 10.

Without departing from the spirit of the invention, other embodiments of a method for the coexistence between the Bluetooth module and the WiMAX/LTE module, or between WiFi module and WiMAX/LTE module, handled by the control unit can be devised with relevant modifications according to the architectures in FIGS. 4 and 13, and the control flows in FIGS. 12A to 12G and 14A to 14G.

Figure 15:
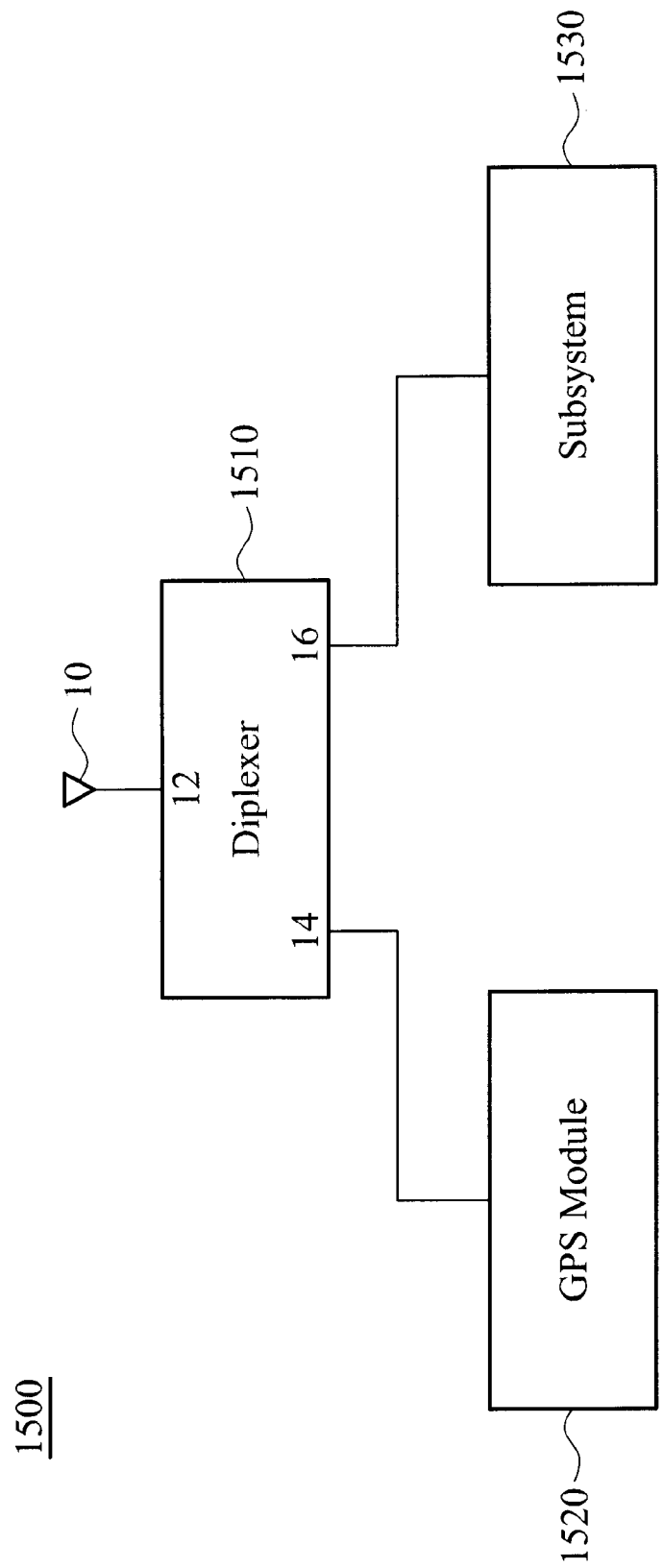
FIG. 15 shows a system for coexistence between a Global Positioning System (GPS) and a subsystem sharing a single antenna according to an embodiment of the invention.

Although the WiFi and BT wireless communication services are used for illustration of the invention, other wireless communication services can be used, such as Global Positioning System (GPS). FIG. 15 shows another embodiment of a system for the coexistence between a Global Positioning System (GPS) and a subsystem sharing a single antenna, wherein the subsystem may be any one of the systems 400 and 1300 excluding the antenna 10. The system 1500 comprises an antenna 10, a diplexer 1510, a GPS module 1520, and a subsystem 1530. The diplexer 1510, which consists of three terminals 12, 14, and 16, is configured to connect the terminal 12 to both terminals 14 and 16 such that the GPS signals (Tx or Rx signal) are transmitted to/received from the shared antenna 10 via the diplexer 1510, and the wireless signals of the subsystem 1530 (Tx or Rx signal) are simultaneously transmitted to/received from the shared antenna 10 via the diplexer 1510.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communications system, comprising:
a first wireless communications module configured to transmit or receive a first wireless signal in a first frequency band selected from a first frequency range; and
a second wireless communications module configured to transmit or receive a second wireless signal in a second frequency band selected from a second frequency range which overlaps at least in part with the first frequency range;
wherein the first wireless communications module is further configured to determine an in-band range in the overlapping part of the first and second frequency ranges, wherein the in-band range corresponds to a frequency range where a received first wireless signal and a received second wireless signal experience in-band interference caused by a transmitted second wireless signal and a transmitted first wireless signal, respectively; and
wherein the second wireless communications module is further configured to determine whether a frequency offset between the first frequency band and the second frequency band falls within the in-band range, and adjust a transmission power of the second wireless signal in response to the frequency offset falling within the in-band range.

2. The system as claimed in claim 1, wherein the adjustment of the transmission power of the second wireless signal comprises decreasing the transmission power of the second wireless signal when the frequency offset between the first frequency band and the second frequency band is less than or equal to a predetermined threshold.

3. The system as claimed in claim 2, wherein the decreased transmission power of the second wireless signal meets a requirement so that the first wireless signal can be received by the first wireless communications module in concurrence with transmission of the second wireless signal by the second wireless communications module.

4. The system as claimed in claim 1, wherein the second frequency range comprises a plurality of hopping channels, and the adjustment of the transmission power of the second wireless signal is performed when a frequency offset between a next hopping channel of the second wireless signal and the first frequency band is within the predetermined range.

5. The system as claimed in claim 1, wherein the first frequency range comprises a plurality of hopping channels, and the adjustment of the transmission power of the second wireless signal is performed when a frequency offset between the second frequency band of the second wireless signal and a next hopping channel of the first wireless signal is within the predetermined range.

6. The system as claimed in claim 1, wherein the transmission power of the second wireless signal is adjusted according to at least the frequency offset between the first wireless signal and the second wireless signal, transceiving modulation types, or a signal indicator of the first wireless signal or the second wireless signal.

7. The system as claimed in claim 6, wherein the signal indicator includes received signal strength indications (RSSI), signal to noise ratios (SNR), adjacent channel interferences (ACI), packet error rates (PER), or bit error rates (BER).

8. The system as claimed in claim 5, wherein one of the first and second wireless communication modules determines a channel map describing information of the in-band range of the first or second wireless signal, and sends the channel map and its transceiving modulation type to the other.

9. A method for reducing interference between a plurality of wireless communications modules in a wireless communications device, comprising:
transmitting or receiving a first wireless signal in a first frequency band selected from a first frequency range by a first wireless communications module, and transmitting or receiving a second wireless signal in a second frequency band selected from a second frequency range, which overlaps at least in part with the first frequency range, by a second wireless communications module;
determining an in-band range in the overlapping part of the first and second frequency ranges, wherein the in-band range corresponds to a frequency range where a received first wireless signal and a received second wireless signal experience in-band interference caused by a transmitted second wireless signal and a transmitted first wireless signal, respectively;

determining whether a frequency offset between the first frequency band and the second frequency band falls within the in-band range; and adjusting a transmission power of the second wireless signal in response to the frequency offset falling within the in-band range.

10. The method as claimed in claim 9, wherein the adjustment of the transmission power of the second wireless signal comprises decreasing the transmission power of the second wireless signal when the frequency offset between the first frequency band and the second frequency band is less than or equal to a predetermined threshold.

11. The method as claimed in claim 10, wherein the decreased transmission power of the second wireless signal meets a requirement so that the first wireless signal can be received by the first wireless communications module in concurrence with transmission of the second wireless signal by the second wireless communications module.

12. The method as claimed in claim 9, wherein the second frequency range comprises a plurality of hopping channels, and the adjustment of the transmission power of the second wireless signal is performed when a frequency offset between a next hopping channel of the second wireless signal and the first frequency band is within the predetermined range.

13. The system as claimed in claim 9, wherein the transmission power of the second wireless signal is adjusted according to the frequency offset between the first wireless signal and the second wireless signal, transceiving modulation types, or a signal indicator of the first wireless signals or the second wireless signals.

14. The system as claimed in claim 13, wherein the signal indicator includes received signal strength indications (RSSI), signal to noise ratios (SNR), adjacent channel interferences (ACI), packet error rates (PER), or bit error rates (BER).

* * * * *